(12) United States Patent
Miura et al.

(10) Patent No.: US 6,639,890 B1
(45) Date of Patent: Oct. 28, 2003

(54) OPTICAL DISK DRIVE FOR PRECISELY ADJUSTING THE INTENSITY OF LASER LIGHT IRRADIATED ONTO AN OPTICAL DISK

(75) Inventors: Toshimasa Miura, Yokohama (JP); Yoshihisa Miyazaki, Tachikawa (JP); Yuichi Tsuchimochi, Hino (JP); Yasuhiro Fujiwara, Hachioji (JP); Naoyuki Sato, Tokorozawa (JP); Yoshiyuki Fukuya, Sagamihara (JP)

(73) Assignee: Olympus Optical (JP)

( * ) Notice: Subject to any disclaimer, the term of this patent is extended or adjusted under 35 U.S.C. 154(b) by 0 days.

(21) Appl. No.: 09/339,440

(22) Filed: Jun. 24, 1999

(30) Foreign Application Priority Data

| Jun. 29, 1998 | (JP) | 10-183095 |
| Jun. 29, 1998 | (JP) | 10-183096 |
| Jun. 29, 1998 | (JP) | 10-183097 |

(51) Int. Cl.$^7$ .................................................. G11B 7/00
(52) U.S. Cl. ................. 369/116; 369/13.26; 369/47.5; 369/116; 369/59.11
(58) Field of Search .................. 369/116, 47.5, 369/47.52, 47.53, 53.35, 13.24, 13.27, 53.31, 59.11, 53.27, 44.26, 13.26

(56) References Cited

U.S. PATENT DOCUMENTS

| 5,450,383 A | * | 9/1995 | Call et al. ............ 369/116 |
| 5,475,666 A | * | 12/1995 | Ito et al. ............. 369/116 |
| 5,493,549 A | * | 2/1996 | Miyazawa ........... 369/116 |
| 5,602,814 A | * | 2/1997 | Jaquette et al. ...... 369/116 |
| 5,642,343 A | * | 6/1997 | Toda et al. .......... 369/116 |
| 5,905,695 A | * | 5/1999 | Kimura ............... 369/116 |
| 5,936,924 A | * | 8/1999 | Tanaka ............... 369/116 |
| 6,392,970 B1 | * | 5/2002 | Fuji et al. ........... 369/116 |

FOREIGN PATENT DOCUMENTS

| JP | 63-108539 | 5/1988 |
| JP | 2-308425 | 12/1990 |
| JP | 6-36377 | 2/1994 |
| JP | 7-1562 | 1/1995 |
| JP | 7-153078 | 6/1995 |
| JP | 9-293259 | 11/1997 |

* cited by examiner

Primary Examiner—William Korzuch
Assistant Examiner—Kim-Kwok Chu
(74) Attorney, Agent, or Firm—Ostrolenk, Faber, Gerb & Soffen, LLP

(57) ABSTRACT

An amplitude detection circuit detects the peak value of an output signal of a photo-detector amplified by a head amplifier. The peak value detected by the amplitude detection circuit is read into a drive controller, and compared with a target value suitable for coding in a binary format a detected signal. The gain of a variable gain amplifier is adjusted accordingly. Consequently, an analog signal processing circuit can stably codify the detected signal in a binary format. Under the control of the drive controller, a recording power level calculation circuit determines a test writing power level with which test writing is performed on a test track of a magneto-optical disk. The recording power level calculation circuit then calculates an actual record power for each zone of the magneto-optical disk according to the test writing power level.

6 Claims, 32 Drawing Sheets

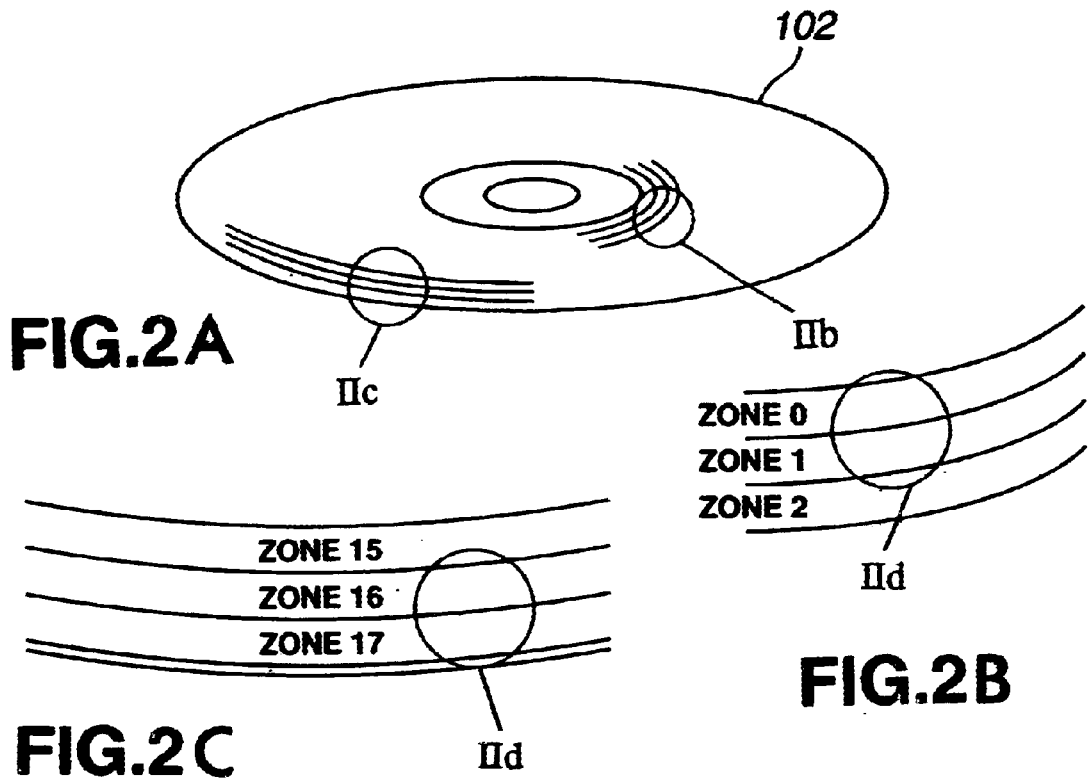
FIG.2A
FIG.2B
FIG.2C
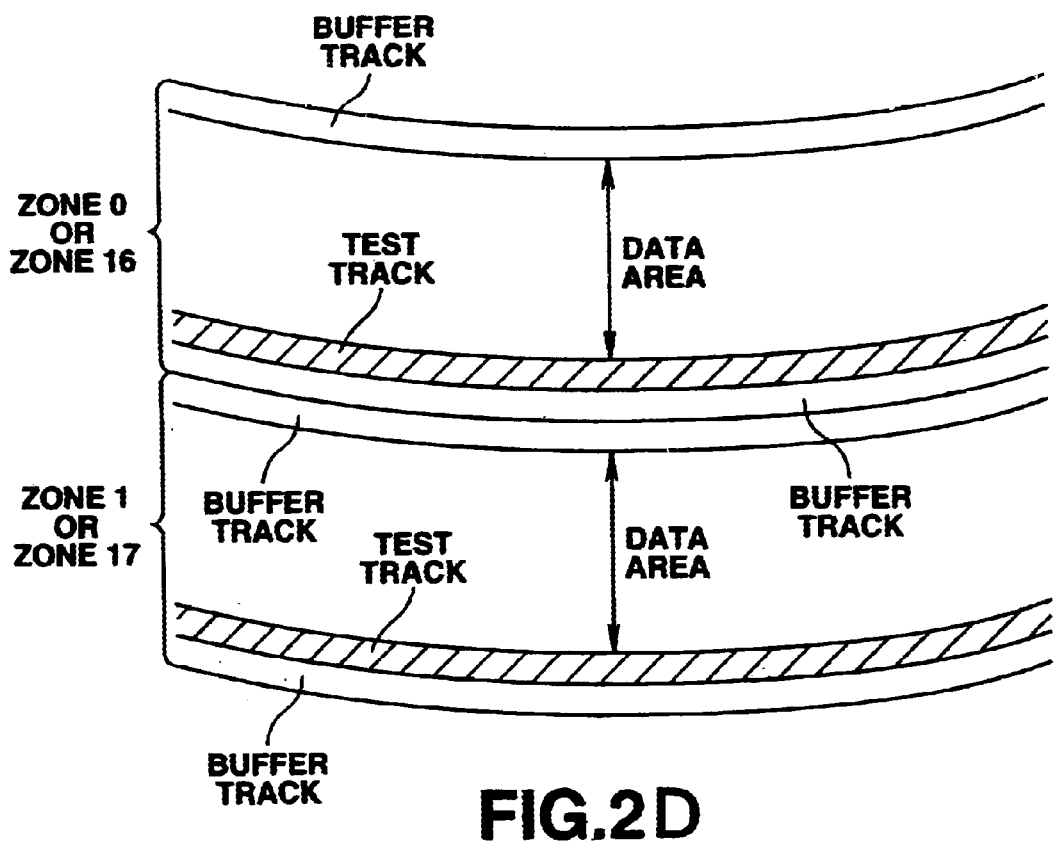
FIG.2D

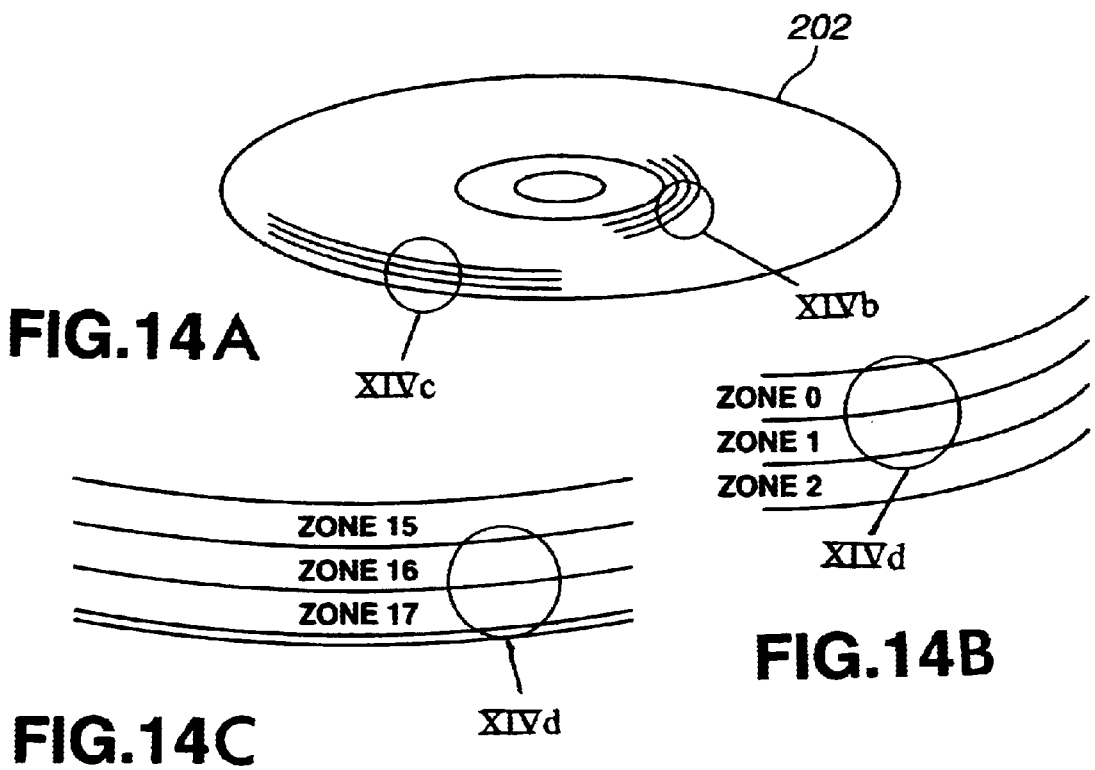
FIG.14A
FIG.14B
FIG.14C
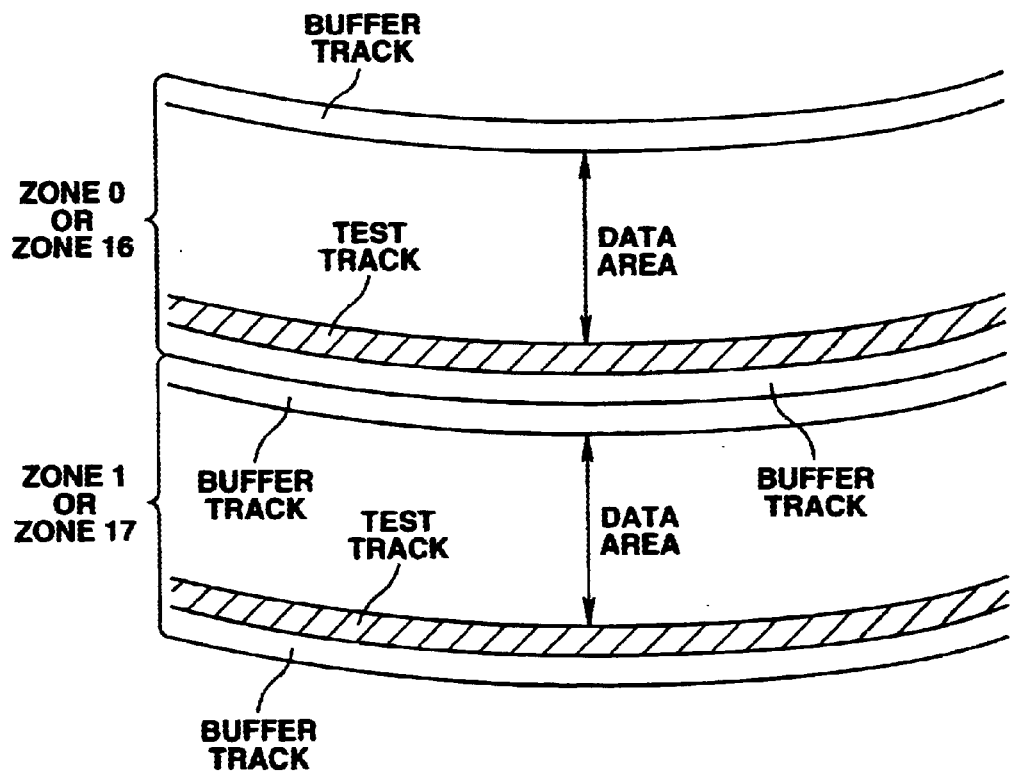
FIG.14D

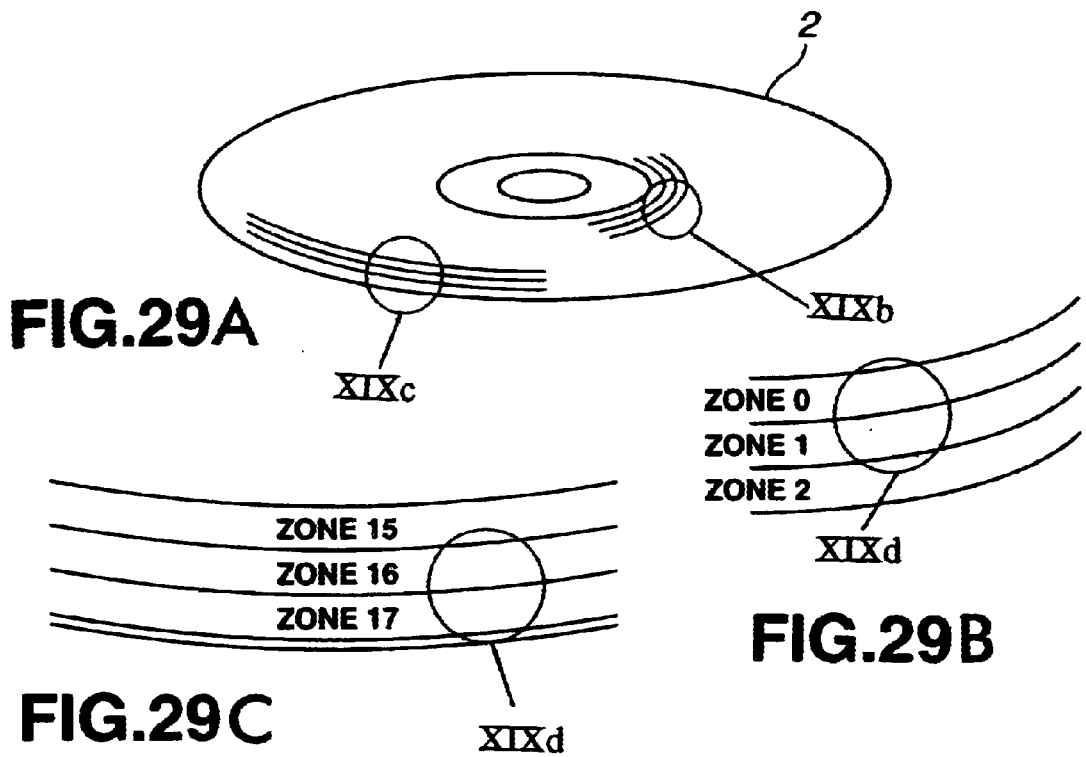
FIG.29A
FIG.29B
FIG.29C
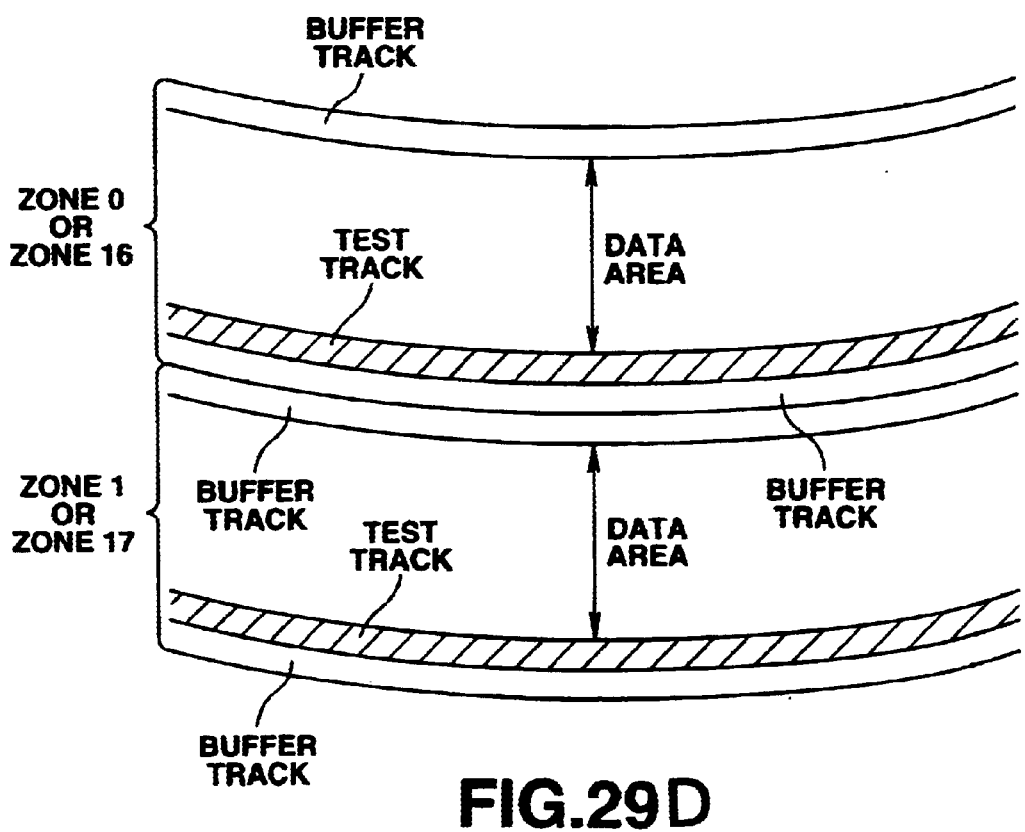
FIG.29D

OPTICAL DISK DRIVE FOR PRECISELY ADJUSTING THE INTENSITY OF LASER LIGHT IRRADIATED ONTO AN OPTICAL DISK

BACKGROUND OF THE INVENTION

1. Field of the Invention

The present invention relates to an optical disk drive, or more particularly, to an optical disk drive with laser light intensity adjustment capability.

2. Description of Related Art

Optical disks are used as a core recording medium for multimedia formats. A magneto-optical disk of 3.5 inches in diameter has storage capacities of 540M bytes and 640M bytes, well above conventionally available storage capacities of 128M bytes and 230M bytes. Thus, the magneto-optical disk has become a high-density recording medium in recent years.

In the magneto-optical disk of 3.5 inches in diameter, tracks are divided into zones for zone constant angle velocity recording (ZCAV recording) according to which the number of sectors remains the same among zones. The number of zones of a conventional medium offering the storage capacity of 128M bytes is 1, and that offering the storage capacity of 230M bytes is 10. A high-density recording medium offering the storage capacity of 540M bytes or 640M bytes put to practical use in recent years has a pitch between tracks thereon becoming narrower with an increase in recording density, thus the number of zones is increasing drastically.

The recording medium offering 640M bytes has eleven zones or a relatively small number of zones. The recording medium offering 540M bytes has eighteen zones nearly double the number of zones of conventional recording media. Optimal erasure power levels and optical recording power levels of magneto-optical disks differ from medium to medium. When a medium is loaded, glow adjustment is performed for optimizing an erasure power level and recording power level.

As described in, for example, the Japanese Unexamined Patent Publication No. 9-293259, test writing is performed in inner and outer circumferential zones. The recording power levels for intermediate zones are calculated by linearly approximating them to the recording power levels for the inner and outer circumferential zones. Thus, glow adjustment is achieved.

On the conventional recording medium offering 128M bytes or 230M bytes, data is recorded by pit position modulation (PPM). The power level of glow may be changed in two stages or changed between an erasure power level and recording power level. For the recording medium offering 540M bytes or 640M bytes, recording based on pulse width modulation (PWM) is adopted to raise the recording density. For PWM-based recording, the power level of glow must be changed in four stages; that is, changed among an erasure power level, a first writable power level, a second writable power level, and a third writable power level.

The following is based on recording data on a magneto-optical disk which, in this example, offers the storage capacity of 540 bytes or 640M bytes in conformity with the ISO/IEC 15041. Recording data on this type of magneto-optical disk differs from recording data on a conventional magneto-optical disk. Specifically, for representing a value "1" out of two values "0" and "1", the writing start and end pulses of a recording signal (hereinafter, "edges") are used but the recording signal itself is not. In this edge recording, the edges of the recording signal are requested to offer a good jitter characteristic.

This magneto-optical disk, as shown in FIG. 35, has a preheat power level (P1), a leading edge recording power level (P2), and a trailing edge recording power level (P3). The preheat power level P1 raises the temperature of a medium prior to recording of a signal. The leading edge recording power level P2 and trailing edge recording power level P3 independently establish the leading and trailing edges of a signal. A pulse train exhibiting three power level values is used to record data to avoid thermal interference of the leading and trailing edges. The pulse train has pulses, which exhibit the leading and trailing edge recording power levels P2 and P3, arranged in the form of a comb with the preheat power level P1 defining the base level.

As mentioned above, an optimal power level of a magneto-optical disk differs with temperature and from medium to medium. It is therefor necessary to establish a power level for each zone by test writing.

According to, for example, Japanese Unexamined Patent Publication No. 63-108539, a cartridge accommodating an optical recording medium has a magnetic information recording portion on which the conditions for optical recording are recorded. When the cartridge is loaded, the magnetic information is read to determine the conditions for recording data on, reproducing data from, and erasing data from the optical recording medium.

Moreover, according to Japanese Unexamined Patent Publication No. 2-308425, the conditions for recording compatibly with disks are stored in a recording means in advance. When a disk is loaded, information is read from a disk controller track. The information includes, for example, the conditions for manufacturing a disk including the condition that the disk must be vendor-unique. The conditions for recording, reproducing, and erasing data that are compatible with an inserted disk are selected from among the stored conditions for recording. Glow adjustment is thus carried out.

When a medium is loaded, test writing is carried out in order to optimize an erasure power level and recording power level. Glow adjustment may thus be achieved. According to, for example, Japanese Unexamined Patent Publication No. 62-285258, standard data is stored in a ROM or the like in advance. To begin with, ambient temperature is measured. A driving current associated with the ambient temperature is retrieved from the standard data in relation to the radius of each magneto-optical disk. A semiconductor laser is driven with the driving current that is a rectangular wave having a duty ratio of 50%. Test writing is performed on a magneto-optical disk. A light-receiving device and a secondary strain detection circuit are used to reproduce data recorded during the test writing. The driving current with which the semiconductor laser is driven is varied so that the duty ratio of the reproduced signal will be 50%, hence the output of the secondary strain detection circuit will be negligible. Recording and reproducing are repeated, thus establishing a power level for each zone.

The duty ratio of the reproduced signal described in the Japanese Unexamined Patent Publication No. 62-285258 varies according to the irregular sensitivity of a magneto-optical disk or a rotary deviation thereof. This means that it is impossible to establish precisely a power level according to the method involving the duty ratio of the reproduced signal.

The new generation of magneto-optical recording media is foreseen to have narrower recording tracks. Thus, the diameter of a laser light spot restricted by the wavelength of laser light and the numerical aperture (NA) of an optical system may become larger than the pitch between tracks. Nevertheless, an attempt may be made to erase data from a track with the erasure power level attained by driving a semiconductor laser with a direct current (DC) causing the semiconductor laser to glow. In this case, recording signals representing data written on adjoining tracks may be erased with heat stemming from a spot of laser light exhibiting the erasure power level. In other words, so-called cross erasure may occur. Consequently, data storage on ever-narrowing recording tracks will become increasingly difficult.

SUMMARY OF THE INVENTION

An object of the present invention is to provide an optical disk drive capable of establishing precisely at least one of a recording power level and an erasure power level.

Another object of the present invention is to provide an optical disk drive capable of establishing precisely at least a recording power level.

Still another object of the present invention is to provide an optical disk drive capable of establishing precisely an erasure power level while preventing at lease cross erasure attributable to narrow tracks on a high-density medium.

An optical disk drive is accordance with the present invention comprises a laser control means, an information reproducing means, an amplitude measuring means, and a power calculating means. The laser control means arbitrarily controls the power of laser light to be irradiated onto a test area on a recording medium. The information reproducing means reads and reproduces recording information, which has been recorded with the power level, from the recording medium. The amplitude measuring means measures the amplitude of a reproduced signal provided by the information reproducing means. The power calculating means calculates at least one of the recording power level and erasure power level according to a test power level. Specifically, the laser control means sequentially varies the power of laser light irradiated onto the test area on the recording medium. The amplitude measuring means measures the amplitude of the reproduced signal representing data acquired from the test area. The test power level is selected such that the measured amplitude falls within a predetermined range.

In the optical disk drive according to the present invention, the laser control means sequentially varies the power of laser light irradiated onto the test area on the recording medium. The amplitude measuring means measure the amplitude of the reproduced signal representing data acquired from the test area. Based on a test power level, selected such that the measured amplitude falls within a predetermined range, the power calculating means calculates at least one of the recording power level and erasure power level. Thus, at least one of the recording power level and erasure power level can be set precisely.

Other features and advantages of the present invention will be fully apparent from the description below.

BRIEF DESCRIPTION OF THE DRAWINGS

FIG. 1 to FIG. 13 relate to the first embodiment of the present invention;

FIG. 1 is a schematic view of a configuration of a magneto-optical disk drive constructed according to principles of the invention;

FIG. 2A is a schematic view of a magneto-optical disk to be loaded in the magneto-optical disk drive of FIG. 1;

FIGS. 2B and 2C are partial schematic views, drawn to an enlarged scale, along lines IIb—IIb and IIc—IIc, respectively, in FIG. 2A;

FIG. 2D is a partial schematic view, drawn to an enlarged scale, along line IId—IId, of FIGS. 2B and 2C;

FIG. 3 is a flowchart describing an operation of the magneto-optical disk drive shown in FIG. 1;

FIG. 4 is a flowchart describing an operation of the magneto-optical disk drive shown in FIG. 1;

FIG. 5 is a graphical view of recording power levels calculated according to the operation of FIG. 4;

FIG. 6 is a graphical view of a first example of coefficients by which a test writing power level employed in the operation of FIG. 4 is multiplied;

FIG. 7 is a graphical view of the first example of coefficients by which the test writing power level employed the operation of FIG. 4 is multiplied;

FIG. 8 is a graphical view of a second example of coefficients by which the test writing power level employed in the operation of FIG. 4 is multiplied;

FIG. 9 is a graphical view of the second example of coefficients by which the test writing power level employed in the operation of FIG. 4 is multiplied;

FIG. 10 is a graphical view of the second example of coefficients by which the test writing power level employed in the operation of FIG. 4 is multiplied;

FIG. 11 is a graphical view of the second example of coefficients by which the test writing power level employed in the operation of FIG. 4 is multiplied;

FIG. 12 is a flowchart describing a variant of the operation described in FIG. 3;

FIG. 13 to FIG. 25 relate to the second embodiment of the present invention;

FIG. 13 is a schematic view of another configuration of a magneto-optical disk drive constructed according to principles of the invention;

FIG. 14A is a schematic view of a magneto-optical disk to be loaded in the magneto-optical disk drive of FIG. 13;

FIGS. 14B and 14C are partial schematic views, drawn to an enlarged scale, along lines XIVb—XIVb and XIVc—XIVc, respectively, of FIG. 14A;

FIG. 14D is a partial schematic view, drawn to an enlarged scale, along line XIVd—XIVd, of FIGS. 14B and 14C;

FIG. 16 is a flowchart describing an operation of the magneto-optical disk drive shown in FIG. 13;

FIG. 17 is a second flowchart describing an operation of the magneto-optical disk drive shown in FIG. 13;

FIG. 18 is a graphical view of recording power levels calculated according to the operation of FIG. 17;

FIG. 19 is a graphical view of a first example of coefficients by which a test writing power level employed in the operation of FIG. 17 is multiplied;

FIG. 20 is a graphical view of the first example of coefficients by which the test writing power level employed in the operation of FIG. 17 is multiplied;

FIG. 21 is a graphical view of a second example of coefficients by which the test writing power level employed in the operation of FIG. 17 is multiplied;

FIG. 22 is a graphical view of the second example of coefficients by which the test writing power employed in the operation of FIG. 17 is multiplied;

FIG. 23 is a graphical view of the second example of coefficients by which the test writing power employed in the operation of FIG. 17 is multiplied;

FIG. 24 is a graphical view of the second example of coefficients by which the test writing power employed in the operation of FIG. 17 is multiplied;

FIG. 25 is a flowchart that is a variant of the operation described in FIG. 16;

FIG. 26 is a schematic view of a further configuration of a magneto-optical disk drive constructed according to principles of the invention;

FIG. 27 is a graphical view of event timing during an operation of the magneto-optical disk drive shown in FIG. 26;

FIG. 28 to FIG. 34 relate to the fourth embodiment of the present invention;

FIG. 28 is a schematic view of an additional configuration of a magneto-optical disk drive constructed according to principles of the invention;

FIG. 29A is a schematic view of a magneto-optical disk to be loaded in the magneto-optical disk drive of FIG. 28;

FIGS. 29B and 29C are partial schematic views, drawn to an enlarged scale, along lines XXIXb—XXIXb and XXIXc—XXIXc, respectively, of FIG. 29A;

FIG. 29D is a partial schematic view, drawn to an enlarged scale, along line XXIXd—XXIXd, of FIGS. 29B and 29C;

FIG. 30 is a flowchart describing an operation of the magneto-optical disk drive shown in FIG. 28;

FIG. 31 is a flowchart describing the operation of the magneto-optical disk drive shown in FIG. 28;

FIG. 32 is a graphical view of recording power levels calculated according to the operation of FIG. 31;

FIG. 33 is a flowchart describing a variant of the operation of the magneto-optical disk drive shown in FIG. 28;

FIG. 34 is a flowchart describing a variant of the operation of the magneto-optical disk drive shown in FIG. 28.

DESCRIPTION OF THE PREFERRED EMBODIMENTS

Figure 1:
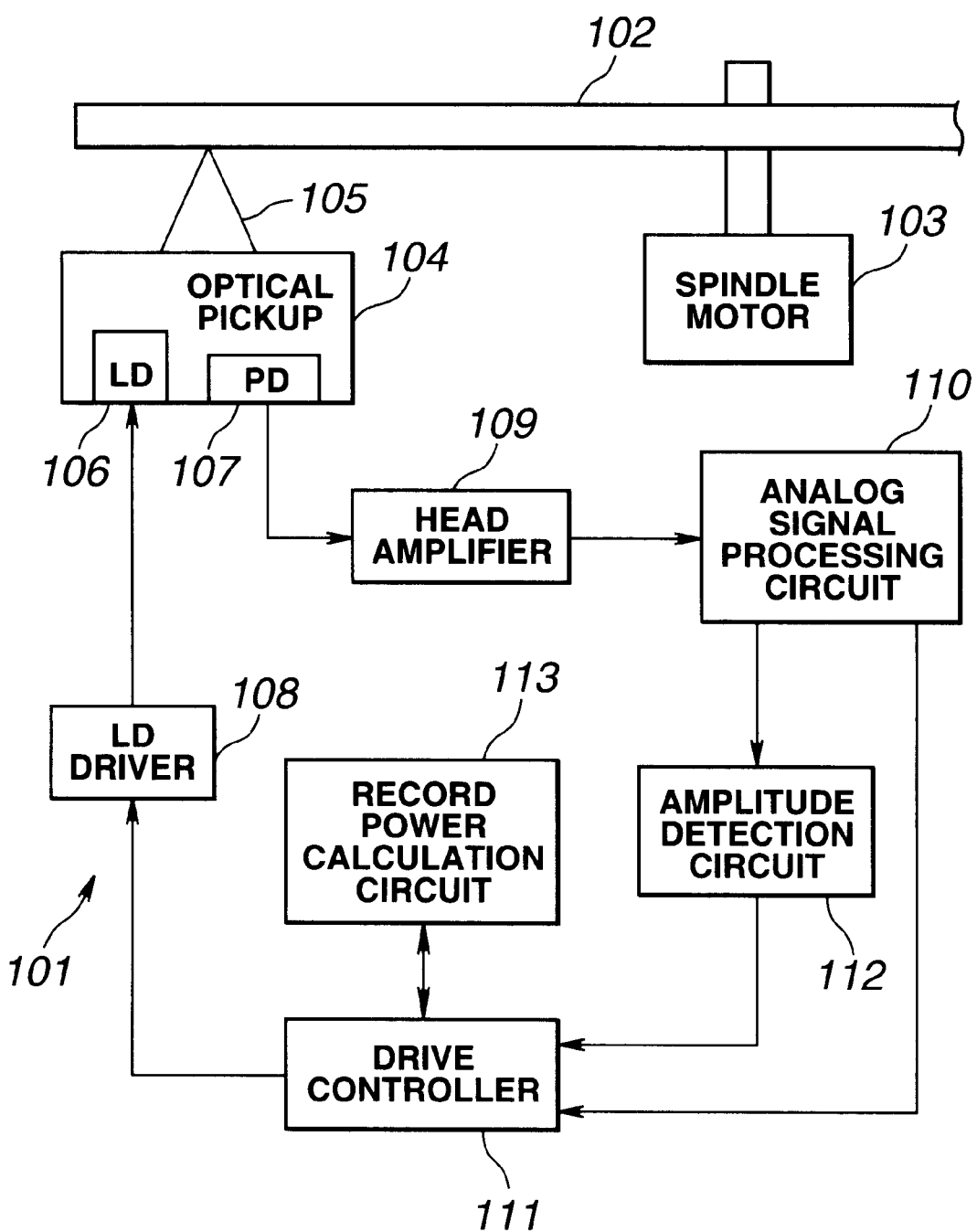

As shown in FIG. 1, a magneto-optical disk 102 on which information is magneto-optically recorded is inserted into a magneto-optical disk drive 101 of this embodiment. The magneto-optical disk 102 is loaded on a spindle motor 103 by a loading mechanism (not shown), and driven to rotate. An optical pickup 104 serving as an optical head is located near the spindle motor 103 so that the optical pickup 104 can move radially relative to the magneto-optical disk 102. The optical pickup 104 irradiates laser light 105, used for recording or reproducing data, onto the magneto-optical disk 102.

The optical pickup 104 has a laser diode (LD) 106 for emitting the laser light 105, and a photo-detector (PD) 107 for receiving light reflected from the magneto-optical disk 102. The optical pickup 104 further includes an optical system (not shown). The optical system narrows the laser light 105 emanating from the laser diode 106 to produce a microscopic spot of emitted laser light. The optical system irradiates light reflected from the magneto-optical disk 102 to the photo-detector 107.

A laser diode driver 108 is connected to the laser diode 106. A driving current is supplied from the laser diode driver 108 to the laser diode 106. An analog signal processing circuit 110 is connected to the photodetector 107 via a head amplifier 109. An output signal of the photo-diode 107 is amplified by the head amplifier 109, and then coded in binary format by the analog signal processing circuit 110.

A binary signal produced by the analog signal processing circuit 110 is sent to a drive controller 111. The drive controller 111 demodulates the signal and corrects any errors in the signal. Data represented by the resultant signal is read as data recorded on the magneto-optical disk 102. The read data is sent to a host computer (not shown), and subjected to various kinds of processing.

An amplitude detection circuit 112 detects the peak value of an output signal of the photo-detector 107 that is amplified by the head amplifier 109. The peak value detected by the amplitude detection circuit 112 is read by the drive controller 111, and compared with a target value suitable for binary-coding of the detected signal. The gain of a variable gain amplifier (not shown) is adjusted accordingly. Consequently, the analog signal processing circuit 110 stably codifies a signal in a binary format.

A recording power level calculation circuit 113 is connected to the drive controller 111. Under the control of the drive controller 111, the recording power level calculation circuit 113 determines a test writing power with which test writing is performed on a test track of the magneto-optical disk 102. The recording power level calculation circuit 113 calculates an actual recording power level for each zone on the magneto-optical disk 102 according to the test writing power.

A focusing means and tracking means (not shown) are included in the magneto-optical disk drive 101.

The magneto-optical disk 102 is, for example, a medium offering 540M bytes, and, as shown in FIG. 2, segmented into eighteen zones ranging from zone 0 to zone 17, as provided under ISO/IEC 15041. Each zone is composed of a user area, buffer tracks, and a test track. The user area is used to record data. The buffer tracks border adjoining zones. The test track is interposed between the outer circumference of the user area and one of the buffer tracks. In general, test writing is performed on the test track in order to set a recording power level for the magneto-optical disk. According to this embodiment, test writing is first performed on the test track within zone 0, that is, the inner circumferential zone, in order to set a recording power level for zone 0. Thereafter, test writing is performed on the test track within zone 16, that is, the outer circumferential zone, in order to set a recording power level for zone 16. The recording power levels for the other zones are set by approximating them linearly relative to the recording power level for zone 0 and the recording power level for zone 16.

As mentioned above, according to this embodiment, test writing is performed on zone 0 and zone 16. The present invention is not limited to this mode. Alternatively, test writing may be performed on only one zone, for example, zone 0. The recording power levels for the other zones may be determined by approximating them linearly relative to the established recording power level. In this case, the time required for setting the recording power levels can be shortened. Test writing also may be performed on one zone or a plurality of zones other than zone 0 and zone 16. In this case, the recording power levels for the other zones can be established precisely.

Next, an operation of this embodiment having the foregoing features will be described below. Namely, a description will be made of a procedure for establishing a recording power level through test writing which is implemented in the magneto-optical disk drive 101 of this embodiment.

Figure 3:
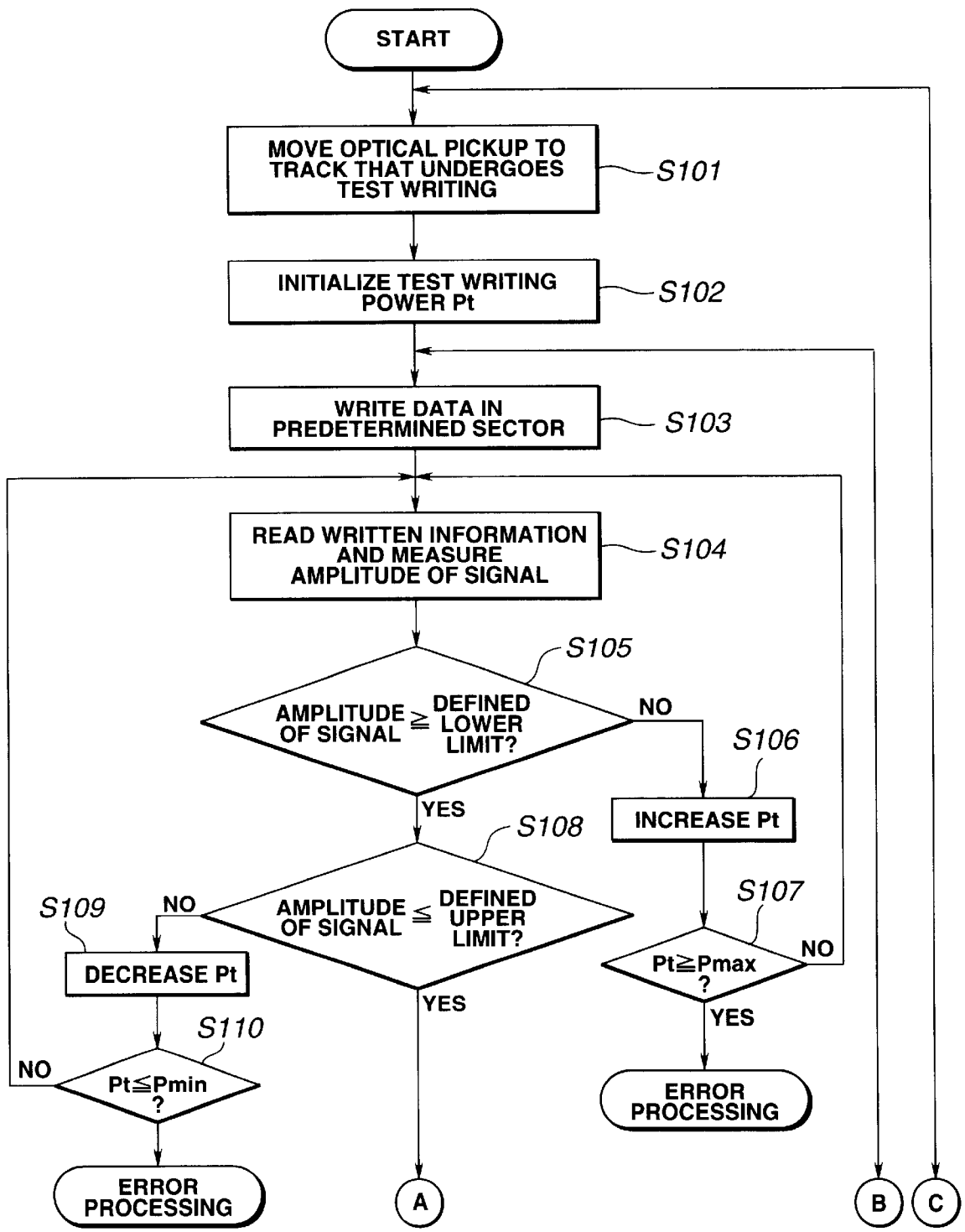

Referring to FIG. 3, first, the magneto-optical disk 102 is loaded in the magneto-optical disk drive 101. The drive controller 111 moves the optical pickup 104 to a test track, on which test writing is performed, at step S101. The test track is within zone 0 (See FIG. 2).

Thereafter, a test writing power level Pt is initialized to a predetermined value at step S102. Data is written in a predetermined sector of the test track, on which test writing is performed, at step S103.

The data to be written, preferably, is a repetition of a single pattern for easy measurement of the amplitude of a signal generated therefrom subsequently.

At step S104, the drive controller 111 measures the amplitude of a signal generated from reading the data written at step S103 by monitoring an output of the amplitude detection circuit 112. At step S105, the drive controller 111 determines whether the amplitude monitored at step S104 falls below a predefined lower limit. If the amplitude falls below the predefined lower limit, the test writing power level Pt is increased at step S106. At step S107, the drive controller 111 determines whether the increased test writing power level Pt has reached an upper limit Pmax of actual recording power levels. If the test writing power level Pt has reached the upper limit Pmax, error processing is carried out and the procedure is terminated. If the test writing power level Pt has not reached the upper limit Pmax, control is returned to step S103 and test writing is restarted.

At step S105, if the drive controller 111 determines that the monitored amplitude is equal to or larger than the predefined lower limit, control is passed to step S108. The drive controller 111 then determines whether the monitored amplitude falls below the predefined upper limit. If the amplitude exceeds the predefined upper limit, the test writing power level Pt is decreased at step S109. At step S110, the drive controller 111 determines whether the test writing power level Pt has reached the lower limit Pmin of actual recording power levels. If the test writing power level Pt has reached the lower limit Pmin, error processing is carried out and the procedure is terminated. If the test writing power level Pt has not reached the lower limit Pmin, control is returned to step S103 and test writing is restarted. The procedure is repeated in order to determine the test writing power level Pt with which the amplitude of the signal generated from recording written data falls within a defined range.

If the target value of the amplitude (means within the defined range) were too small, an error in measurements of the amplitude caused by noise would become significant which is undesirable. By contrast, if the target value of the amplitude were too large, the amplitude of the signal generated from reading written data would be saturated. A variation in amplitude proportional to a variation in writing power level would diminish, increasing an error of the test writing power level Pt, which is not desirable.

Figure 4:
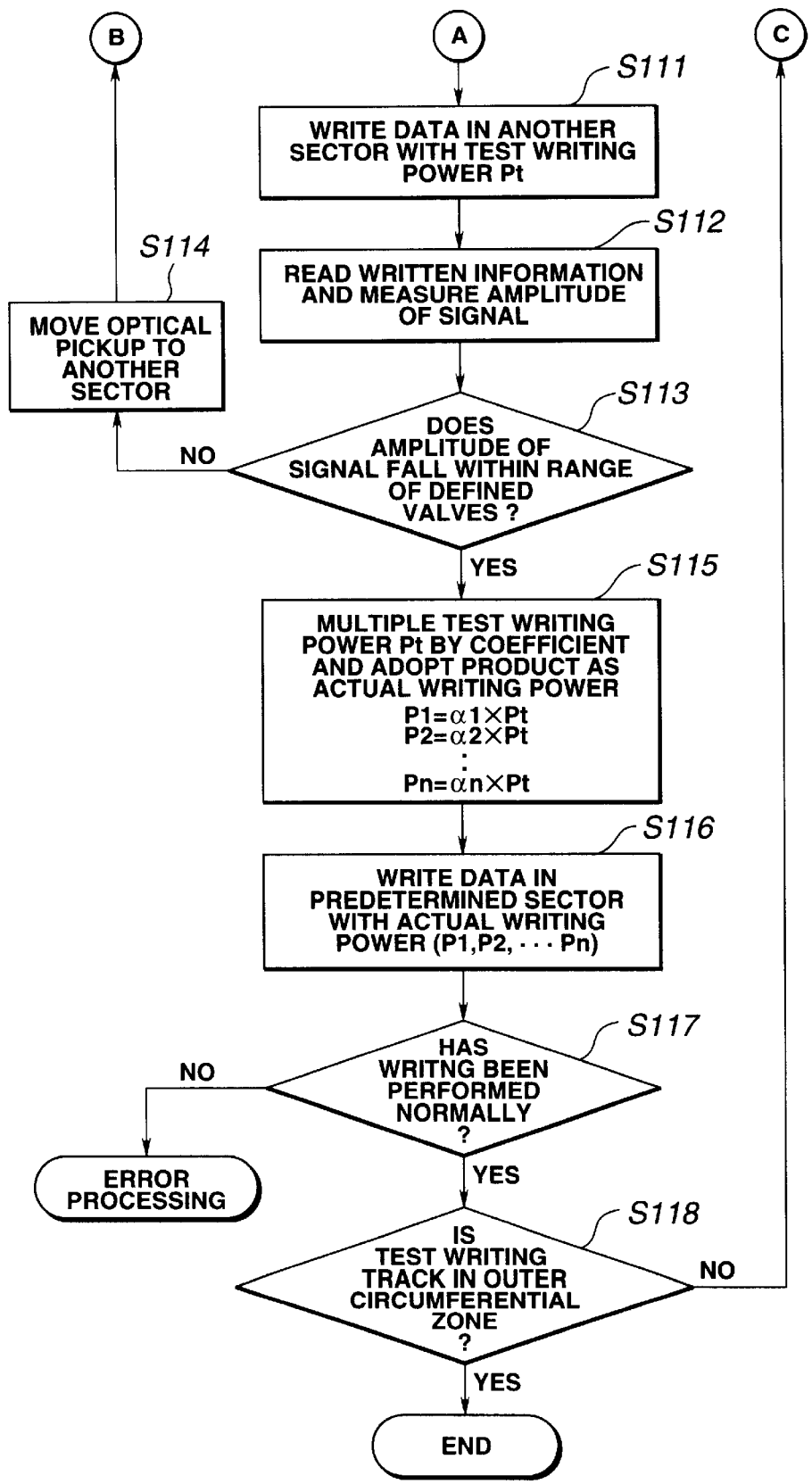

By contrast, at step S108, if the monitored amplitude falls below the predefined upper limit, data is, as described in FIG. 4, written in another sector of the test track with a test writing power level determined at step S111. The amplitude of a signal generated from reading the written data is monitored at step S112. At step S113, the drive controller 111 determines whether the monitored amplitude of the signal generated from reading data written in another sector falls within a range of predefined values ranging from the predefined upper limit to the predefined lower limit. If the monitored amplitude falls outside of the range, the optical pickup is moved to another sector, at step S114, and control is returned to step S102 in FIG. 3 where the procedure is repeated.

At step S113, if the drive controller 111 finds that the amplitude falls within the range of defined values, the recording power level calculation circuit 113 multiplies the test writing power level Pt which is determined through the foregoing processing steps, by a coefficient. The product is adopted as a recording power level with which data is written.

Figure 5:
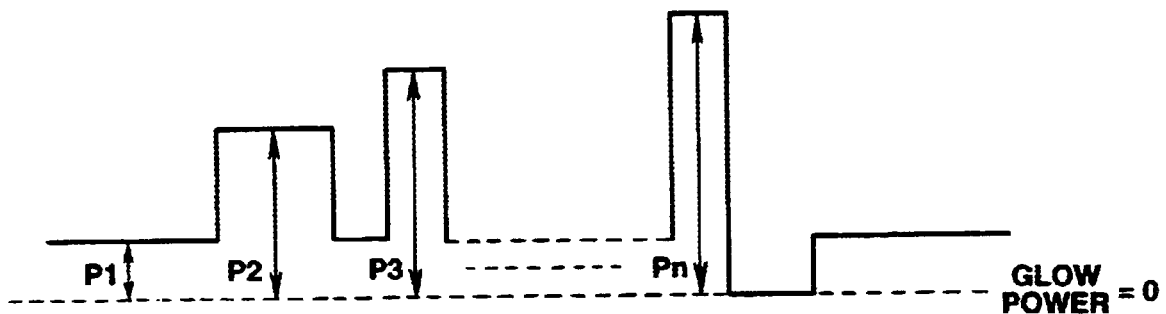

Recording may be carried out according to a pulse train, like the one shown in FIG. 5, which exhibits multiple power levels. In this case, the test writing power level Pt is determined for each of the peak power levels of pulses (P1, P2, P3, . . . , Pn), and then multiplied by a coefficient ($\alpha 1$, $\alpha 2$, $\alpha 3$, . . . , $\alpha n$). The coefficients $\alpha 1$, $\alpha 2$, $\alpha 3$, . . . , $\alpha n$ are specified in advance in the recording power level calculation circuit 113.

Referring back to FIG. 4, at step S116, data is written in a predetermined sector with the recording power level determined at step S115. At step S117, if writing is not achieved normally, such as if an error is detected during verification, error processing is carried out and the procedure is terminated. If writing is achieved normally, at step S118, the drive controller 111 determines whether the test track belongs to zone 16. If the test track belongs to zone 16, the recording power levels for the other zones are set by approximating them linearly relative to the recording power levels for zone 0 and zone 16 and the procedure is then terminated.

In the above description, the test track belongs to zone 0. Control returns from step S118 to step S101 in FIG. 3. The optical pickup is moved to the test track in zone 16 at step 101. The foregoing procedure is repeated, thus setting the recording power level for zone 16. At step S118, the recording power levels for the other zones are set by approximating them linearly relative to the recording power levels for zone 0 and zone 16 and the procedure is then terminated. For setting a recording power level for zone 16, the value to which the test writing power Pt is initialized at step S102 is calculated based on the test writing power level Pt determined for zone 0.

The coefficients $\alpha i$, where i denotes any of 1 to n, should preferably be set depending on temperature, a disk format, a track on which test writing is performed, and a type of disk, for example, a direct overwriting (DOW) type or a non-direct overwriting (NON-DOW) type disk.

A first example of techniques for determining the coefficients $\alpha i$ will be described by taking, for instance, recording of data according to a pulse train exhibiting three power levels P1, P2, P3.

Figure 6:
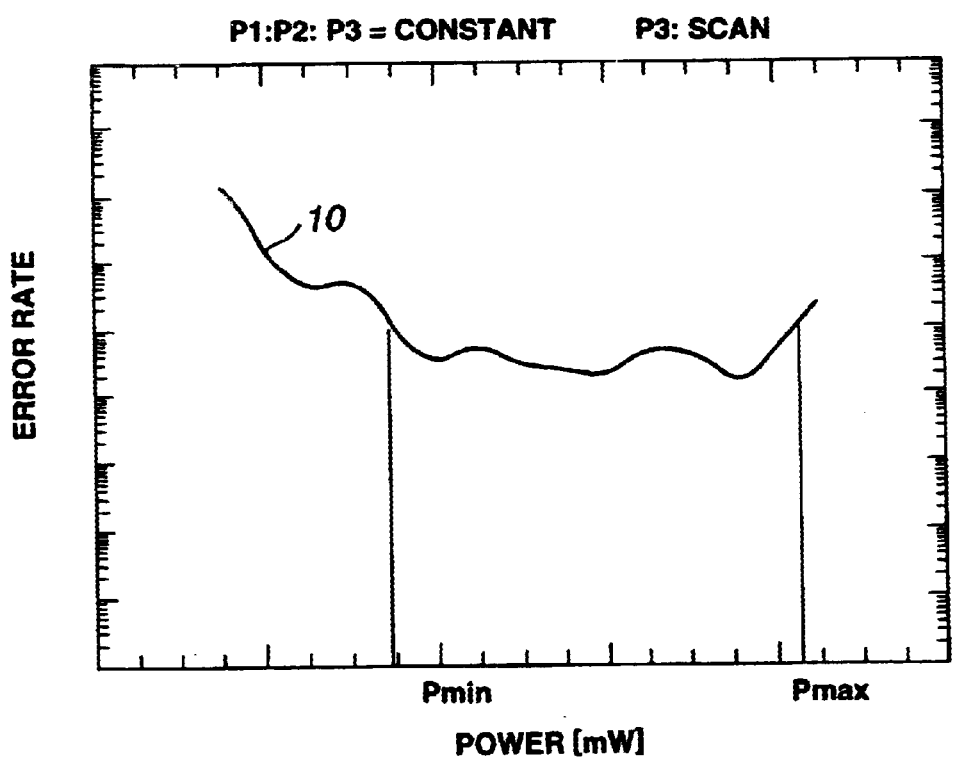

In general, an error rate is employed in evaluating a signal that represents data to be recorded on an optical disk. When the above three values are variable, the error rate varies. When an optical disk drive reads data represented by a signal, error correction is carried out. As long as the error rate of a recording signal is of a certain level, data represented by the signal can be read normally. FIG. 6 is a graph showing a variation in error rate, wherein the ratio of P1 to P2 to P3 is constant and the power level P3 is variable. Assuming that an error rate curve10 indicates the limits of error rates at which an error can be corrected by carrying out error correction, a satisfactory recording domain is defined in FIG. 6 as follows:

$$P\min \leq P3 \geq P\max$$

Hereinafter, the satisfactory recording domain Pmax-Pmin is referred to as the power-related margin of the optical disk drive.

Figure 7:
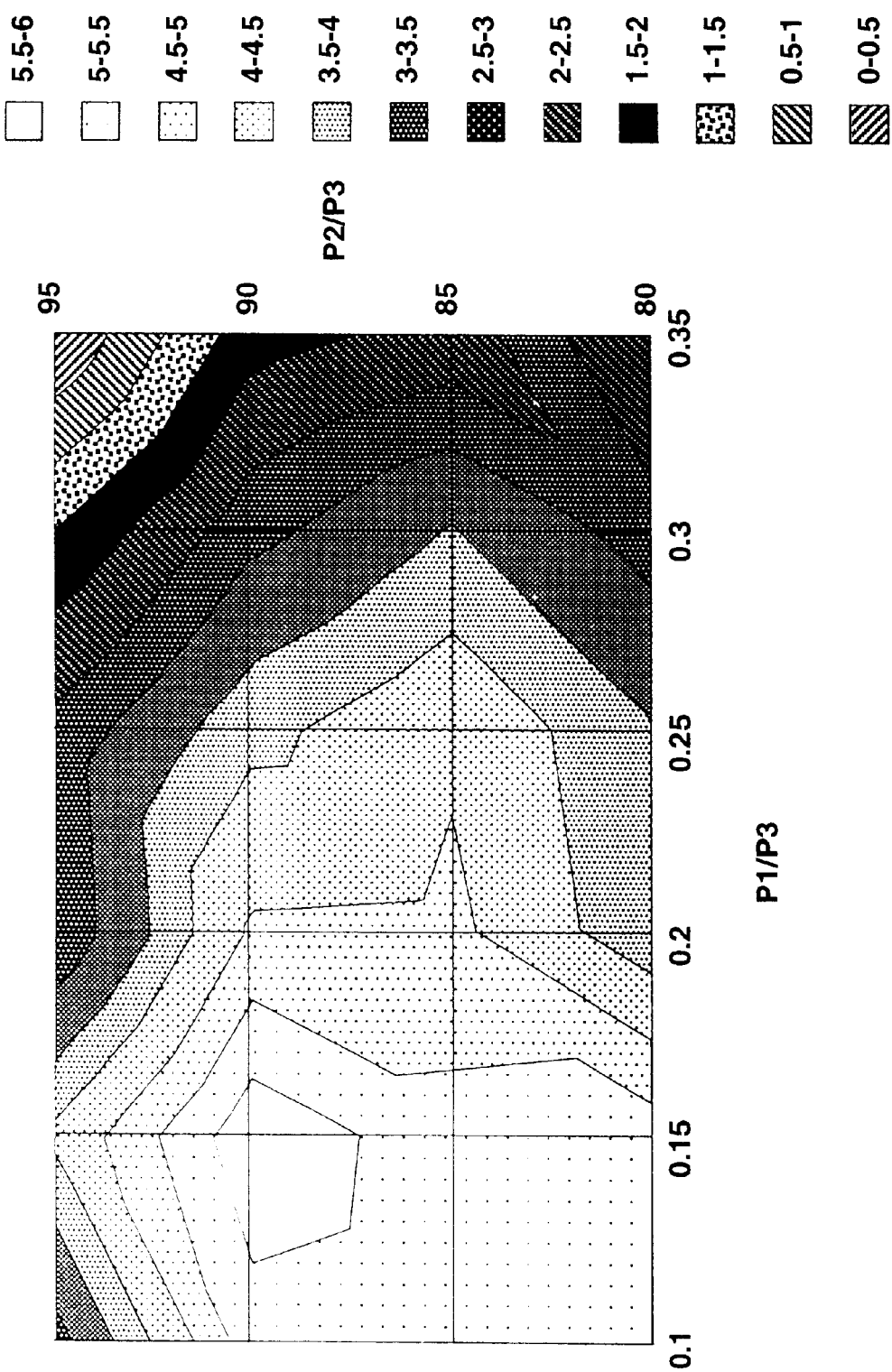

If the ratio of P1 to P2 is modified, and P3 remains variable, the error rate of P3 is measurable. Thus, a power-related margin can be measured relative to each ratio and shown graphically, with the ratio of P1 to P3 on the x axis, the ratio of P2 to P3 on the y axis, and the power-related margin on the z axis, as shown in FIG. 7. In the graph, contour lines linking points of equal values of the power-related margin are drawn in the z-axis direction. The ratios of P1 to P3 and P2 to P3, the values of which belong to a domain looking like the crest or a domain contoured with points indicating the largest power-related margin, shall be expressed as optimal relationships as follows:

$$P1 = a1 \times P3,\ P2 = a2 \times P3$$

where a1 and a2 are constants.

A variation in power level is predictable to occur during recording by the disk drive. An error in measurements of the test writing power level Pt and an error caused by an electrical system in the drive are estimated as a margin of Pmin. The initial writing power level Pmin of P3, indicated in the error rate graph, defines the largest power related margin depicted as the crest. The target value of P3 is then calculated as follows:

$$P3 = P\min/b$$

where b is an error thought to arise in recording data by the optical disk drive.

Herein, when the largest error thought to arise in the optical disk drive is estimated, b can be defined as a constant. Assuming that the ratio of Pmin to the test writing power level Pt is c, the following relationship is established:

$$P\min = c \times Pt$$

Since Pmin and Pt vary depending on the recording sensitivity of a recording medium. The ratio of Pmin to Pt is expressed using the unique constant c.

Once the test writing power level Pt is determined, three optimal values of powers P1, P2, and P3 are defined with unique constants a1, a2, and as relative to the test writing power level Pt as follows:

$$P1 = a1 \times c/b \times Pt = \alpha1 \times Pt$$

$$P2 = a2 \times c/b \times Pt = \alpha2 \times Pt$$

$$P3 = c/b \times Pt = \alpha3 \times Pt$$

Accordingly, $\alpha1$, $\alpha2$, and $\alpha3$ individually should be stored in the recording power level calculation circuit 13.

Next, a second example of techniques for determining the coefficients $\alpha i$ will be described. The magneto-optical disk offering 540M bytes or 640M bytes, as provided under ISO/IEC 15041, covers a light modulation direct overwriting type recording disk (hereinafter, a LIM-DOW disk). When recording on a LIM-DOW disk with a pulse train exhibiting three values of powers as mentioned above, the power P1 is used to erase data. The powers P2 and P3 are used to record data. Thus, recording is achieved by overwriting data without erasure.

Figure 8:
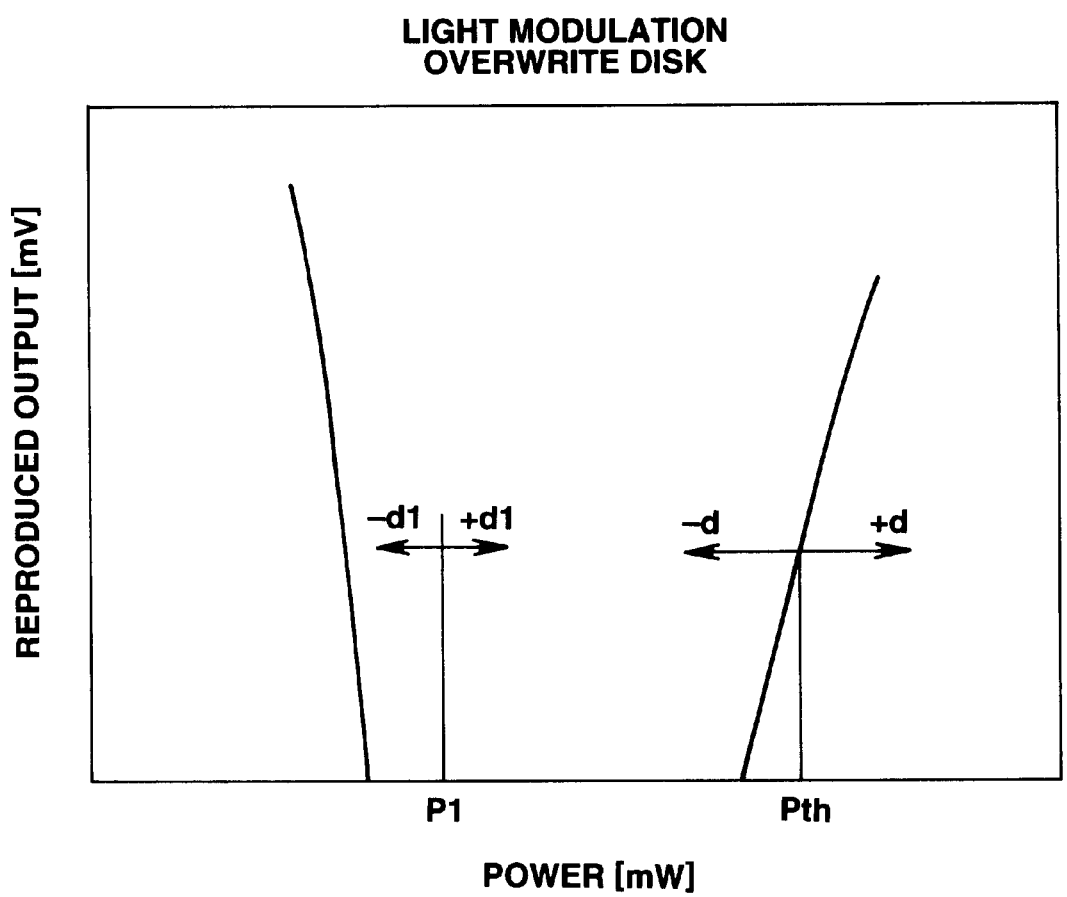

The power level P1 should be be set with a margin large enough to enable erasure. This is because erasure is carried out concurrently with optimization of the jitter of a recording signal. FIG. 8 indicates the characteristics of the LIM-DOW disk concerning erasure and recording. The ratio $\alpha1$ of P1 to the test writing power level Pt is assumed constant. Assuming that a variation in test writing power level Pt due to a difference from one disk to another or from one drive to another occurring in the course of manufacturing is ±d, the margin large enough to enable erasure is defined as follows:

$$\pm d1 = \pm d \times \alpha1$$

It is necessary to ensure that the margin +d1 large enough to enable erasure is appended to the power level P1.

Figure 9:
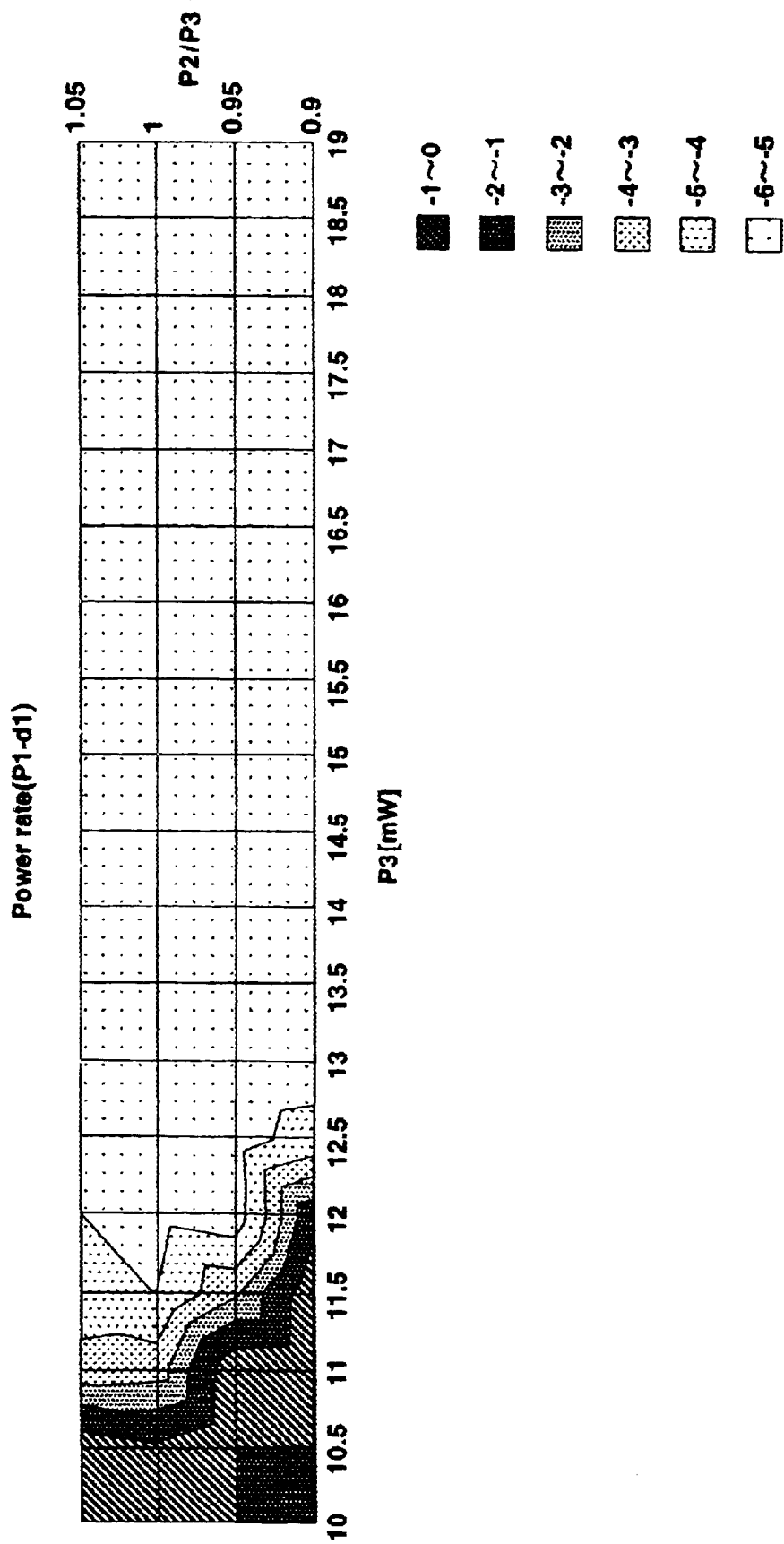
Figure 10:
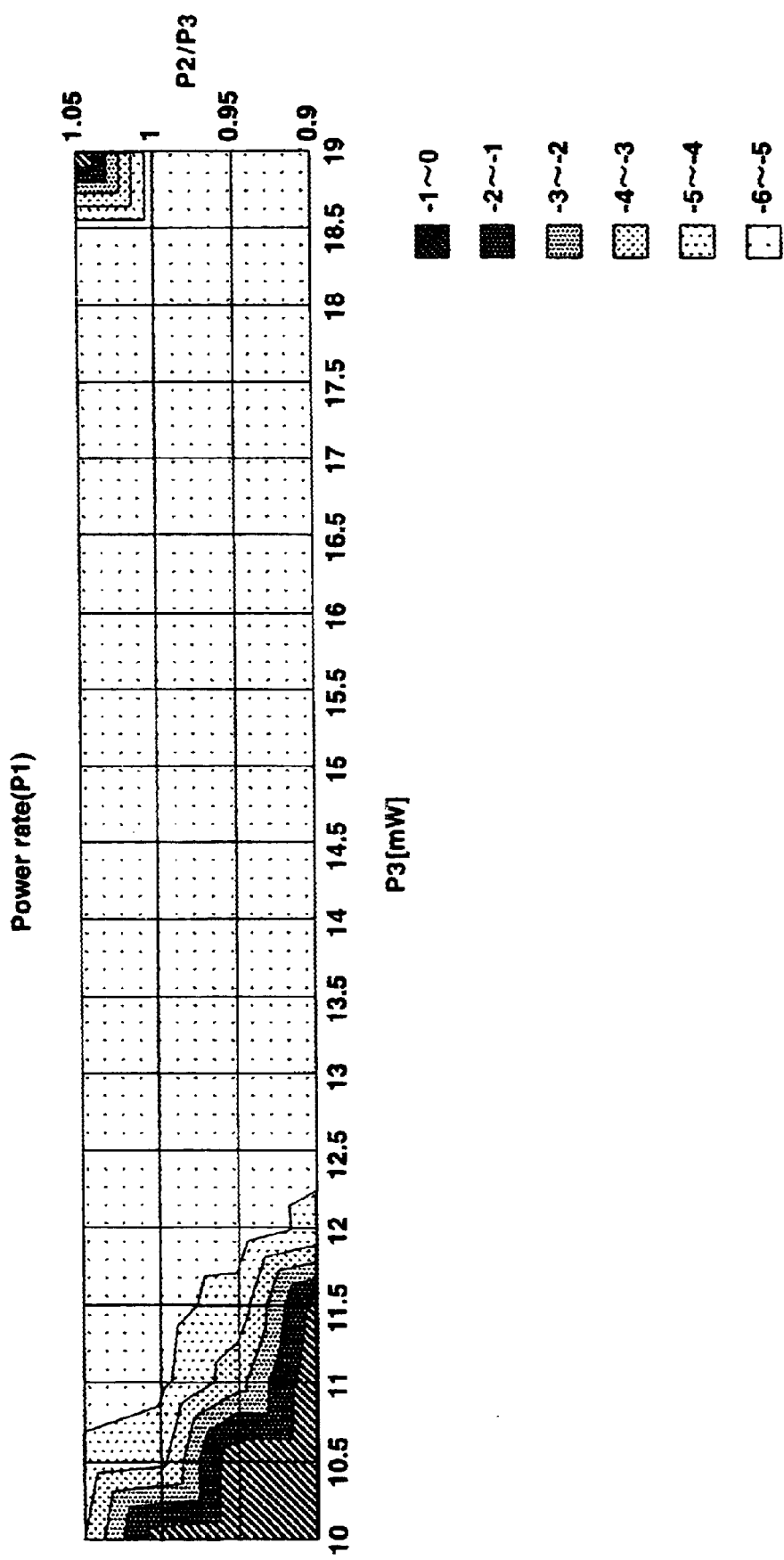
Figure 11:
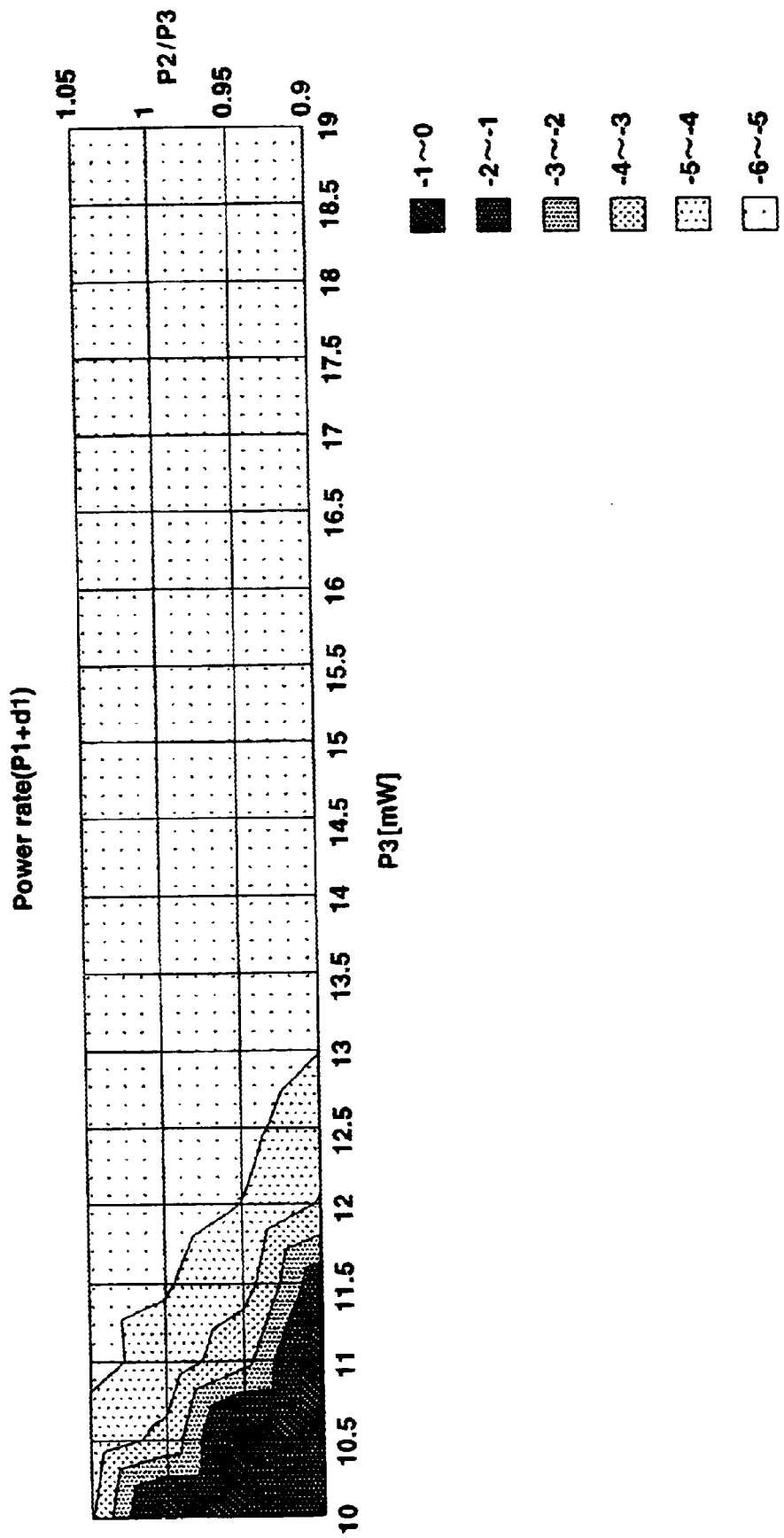

The power-related margin of the optical disk drive is measured relative to P3 by employing P1 or P1+d1 as a fixed value and by varying the ratio of P2 to P3 and graphically represented in FIG. 9 to FIG. 11. The power level P1 associated with a ratio of P2 to P3 providing the largest power-related margin may be ascertained from FIG. 9 to FIG. 11. The power level P1 has a power-related margin when the margin ±d1 is appended thereto. Thus, the relationship of P1 to Pt is defined as follows:

$$P1 = \alpha1 \times Pt$$

The optimal relationship of P2 to P3 is expressed as follows:

$$P2 = a2 \times p3$$

When the largest error b in the initial writing value of P3, which is thought to arise in the optical disk drive, is estimated, P3 is expressed as follows:

$$P3 = P\min/b$$

Since the relationship of P3 to Pt depends on sensitivity, the following relationship is established:

$$P\min\ c \times Pt$$

Even with a LIM-DOW disk, similarly to ordinary disks, three optimal power levels P1, P2, and P3 are defined with unique constants $\alpha1$, $\alpha2$, and $\alpha3$ relative to the test writing power level Pt as follows:

$$P1 = \alpha1 \times Pt$$

$$P2 = a2 \times c/b \times Pt = \alpha2 \times Pt$$

$$P3 = c/b \times Pt = \alpha3 \times Pt$$

Thus, $\alpha1$, $\alpha2$, and $\alpha3$ should be stored individually in the recording power level calculation circuit 113.

As mentioned above, according to this embodiment, the amplitude of a reproduced signal generated from reading written information is measured. A test writing power level Pt is determined based on the measured value. The determined test writing power level Pt is multiplied by a predetermined coefficient in order to set a recording power level. Measurement of the amplitude of a signal will not be affected by the irregular sensitivity of a magneto-optical disk or a rotary deviation thereof. The recording power level for each zone can therefore be set precisely.

The test writing power level Pt is determined by following steps S101 to S110 in FIG. 3. Alternatively, the procedure described in FIG. 12 may be adopted.

Figure 12:
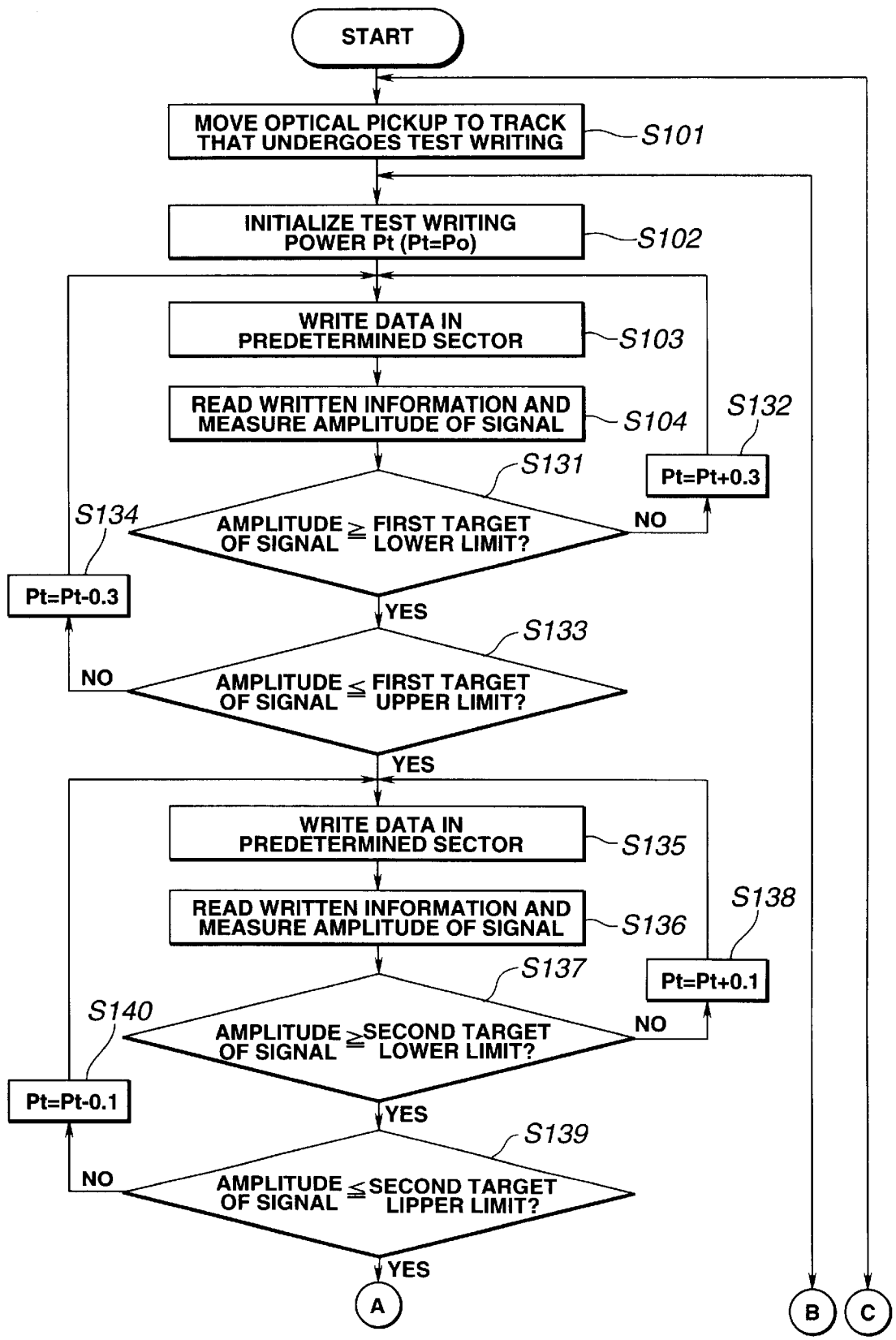

Specifically, as described in FIG. 12, after the processing steps of steps S101 to S104 are completed. At step S131, the drive controller 111 determines that the amplitude monitored at step S104 is equal to or larger than the first predefined target lower limit, control is passed to step S133. The drive controller 111 then determines whether the monitored amplitude falls below a first predefined target upper limit. If the monitored amplitude exceeds the first target upper limit, the test writing power level Pt is decreased by, for example, 0.3 mW at step S134. Control is then returned to step S103 and test writing is restarted.

At step S133, if the drive controller 111 determines that the monitored amplitude falls below the first predefined target upper limit, control is passed to step S135. Data is then written in a predetermined sector with the test writing power level Pt falling within a range from the first target lower limit to the first target upper limit. At step S136, the amplitude of a signal carrying data written at step S135 is measured by monitoring an output of the amplitude detection circuit 112. At step S137, the drive controller 111 determines whether the monitored amplitude is smaller than a second target lower limit that is larger than the first predefined target lower limit. If the monitored amplitude is smaller, the test writing power level Pt is increased by, for example, 0.1 mW at step S138. Control is then returned to step S135 and test writing is restarted.

At step S137, if the drive controller 111 determines that the amplitude monitored at step S136 is equal to or larger than the second predefined target lower limit, control is passed to step S139. The drive controller 111 then determines whether the monitored amplitude falls below a second target upper limit smaller than the first predefined target upper limit. If the monitored amplitude exceeds the second target upper limit, the test writing power level Pt is decreased by, for example, 0.1 mW at step S140. Control is then returned to step S135 and test writing is restarted. This procedure is repeated in order to determine the test writing power level Pt with which the amplitude of a signal generated from reading written data falls within a defined range. Thereafter, control may be passed to step S111 described in conjunction with FIG. 4.

When the procedure described in FIG. 12 is adopted, the test writing power level Pt is determined in two stages according to a range of amplitudes. This embodiment is therefore effective in determining the test writing power level Pt quickly.

Figure 13:
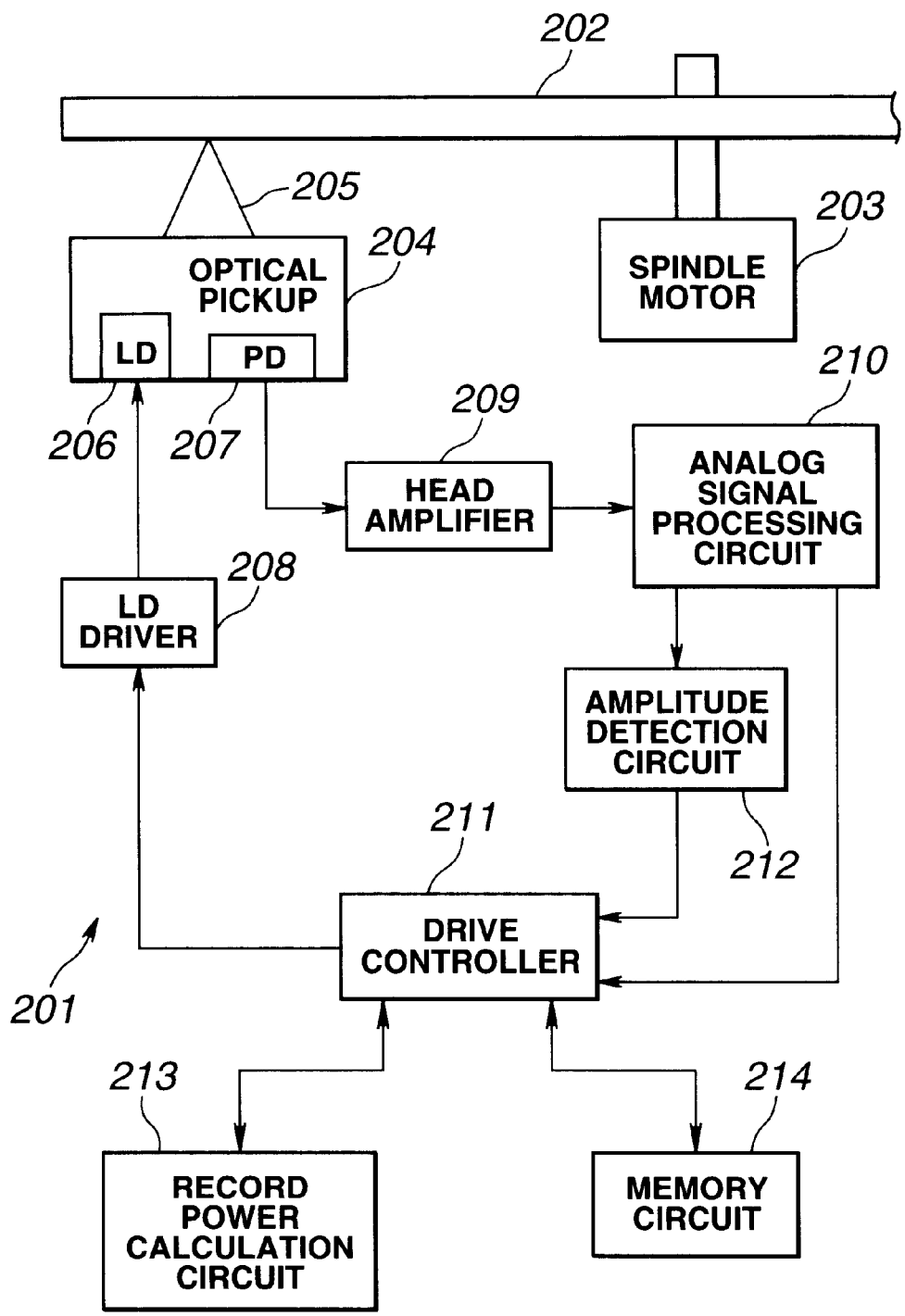

As shown in FIG. 13, a magneto-optical disk 202 on which information is magneto-optically recorded is inserted into a magneto-optical disk drive 201 of this embodiment. The magneto-optical disk 202 is loaded on a spindle motor 203 by a loading mechanism (not shown), and then driven to rotate. An optical pickup 204 serving as an optical head is located near the spindle motor 203 so that the optical pickup can move radially relative to the magneto-optical disk. The optical pickup 204 irradiates laser light 205, used for recording and reproducing data, onto the magneto-optical disk 202.

The optical pickup 204 has a laser diode (LD) 206 for emitting laser light 205 and a photo-detector (PD) 207 for receiving light reflected from the magneto-optical disk 202. The optical pickup 204 further includes an optical system (not shown) for narrowing the laser light 204 emanating from the laser diode 6 to produce a microscopic spot of emitted laser light. The optical system irradiates light reflected from the magneto-optical disk 202 to the photo-detector 207.

A laser diode driver 208 is connected to the laser diode 206. A driving current is supplied from the laser diode driver 208 to the laser diode 206. An analog signal processing circuit 210 is connected to the photodetector 207 via a head amplifier 209. An output signal of the photo-detector 207 is amplified by the head amplifier 209, and then coded in binary format by the analog signal processing circuit 210.

A binary signal produced by the analog signal processing circuit 110 is sent to a drive controller 211. The drive controller 211 demodulates the signal and corrects any errors in the signal. Data represented by the resultant signal is read as data recorded on the magneto-optical disk 202. The read data is sent to a host computer (not shown), and then subjected to various kinds of processing.

An amplitude detection circuit 212 detects the peak value of an output signal of the photo-detector 207 amplified by the head amplifier 209. The peak value detected by the amplitude detection circuit 212 is read into the drive controller 211, and compared with a target value suitable for binary-coding of a detected signal. The gain of a variable gain amplifier (not shown) is adjusted accordingly. Consequently, the analog signal processing circuit 210 codifies a signal on a stable basis in binary format.

A recording power level calculation circuit 213 and a memory circuit 214 are connected to the drive controller 211. Under the control of the drive controller 211, the recording power level calculation circuit 213 determines the test writing power level with which test writing is performed on a test track on the magneto-optical disk 202. Based on the test writing power level, the recording power level calculation circuit 213 calculates an actual recording power level for each zone of the magneto-optical disk 202. Sectors in which it is inhibited to perform test writing on a test track are specified in the memory circuit 214.

A focusing means and tracking means (not shown) are included in the magneto-optical disk drive 201.

The magneto-optical disk 202 is, for example, a medium offering 540M bytes, and, as shown in FIGS. 14A–D, segmented into eighteen zones ranging from zone 0 to zone 17, as provided under ISO/IEC 15041. Each zone is composed of a 10 user area, buffer tracks, and a test track. The user area is used to record data. The buffer tracks border adjoining zones. The test track is interposed between the outer circumference of the user area and one of the buffer tracks. In general, test writing is performed on the test track in order to set a recording power level for a magneto-optical disk. In this embodiment, test writing is first performed on the test track in zone 0, that is, the inner circumferential zone, in order to set a recording power level for zone 0. Thereafter, test writing is performed on the test track in zone 16, that is, the outer circumferential zone, in order to set a recording power level for zone 16. The recording power levels for the other zones are set by approximating them linearly relative to the recording power levels for zone 0 and zone 16.

Figure 15A:
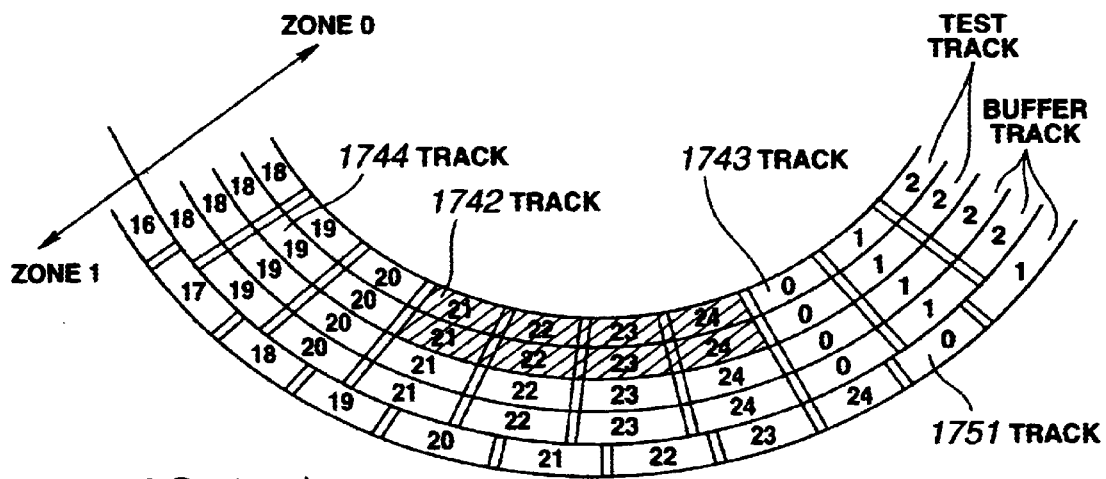
FIGS. 15A and 15B are schematic views of the structures of test tracks and buffer tracks of inner and outer tracks of the magneto-optical disk of FIGS. 14A–14D.
Figure 15B:
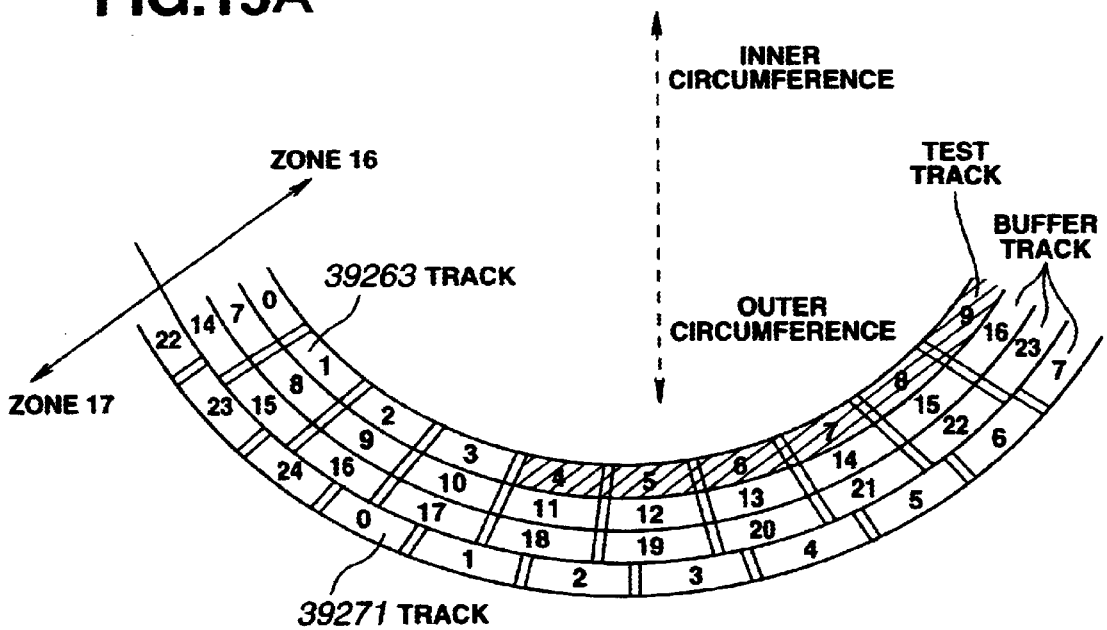

As shown in FIG. 15, sectors are defined radially within the same zone (zone 0 or zone 16 ). The identification divisions of the sectors are located in the same radial directions. However, the arrangement of sectors are different between adjoining zones (zone 0 or zone 16 and zone 1 or zone 17). The identification divisions of the sectors in the adjoining zones are therefore located in mutually different radial directions. In test writing performed on a test track, a signal acquired from the identification division of an adjoining zone may leak into a signal representing data read from a sector because of birefringence. The leaking signal causes a spiked noise signal. This poses a problem in that the amplitude detection circuit 212 cannot measure the amplitude of a signal accurately.

In this embodiment, sectors in zone 0, listed in Table 1, in which it is inhibited to perform test writing on a test track, are specified in the memory circuit 214. Section in zone 16, listed in Table 2, in which it is inhibited to perform test writing on a test track, are specified in the memory circuit 214.

TABLE 1

| Zone No. | Track No. | Sector No. |
| --- | --- | --- |
| Zone 0 | 1742 | 21 22 23 24 |
|  | 1743 | 21 22 23 24 |
|  | 1744 | 21 22 23 24 |
|  | 1745 | 21 22 23 24 |

TABLE 2

| Zone No. | Track No. | Sector No. |
| --- | --- | --- |
|  | 39263 | 4 5 6 7 8 9 10 |
|  | 39264 | 20 21 22 23 24 |
|  | 39265 | 0 1 |

As mentioned above, in this embodiment, test writing is performed on zone 0 and zone 16. The present invention is not limited to this mode. Alternatively, test writing may be perform on only one zone, for example, zone 0 alone. The recording power levels for the other zones may be set by approximating them linearly relative to the recording power level set for the zone. In this case, the time required for setting recording power levels can be shortened. Test writing may be performed on one or a plurality of zones other than zones 0 and 16. In this case, the recording power levels for the other zones can be set precisely.

Next, an operation of this embodiment having the foregoing features will be described. Namely, a description will be made of a procedure of setting a recording power level through test writing which is implemented in the magneto-optical disk drive 201 of this embodiment.

Figure 16:
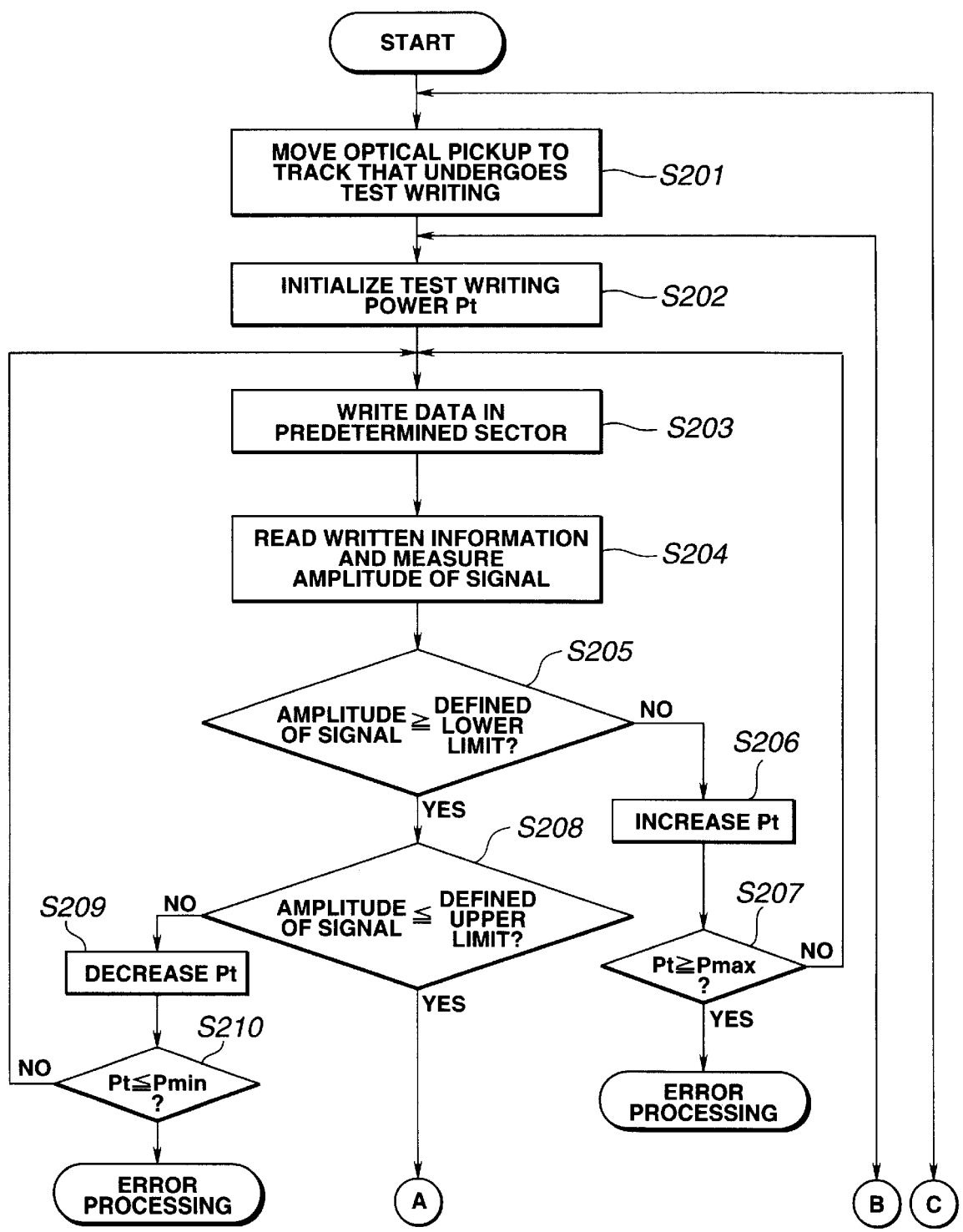

To begin with, the magneto-optical disk 202 is loaded in the magneto-optical disk drive 201. As described in FIG. 16, the drive controller 211 moves the optical pickup 204 to a test track, on which test writing is performed, at step S201. The test track is within zone 0 (See FIGS. 14A–D).

Thereafter, the test writing power level Pt is initialized to a predetermined value at step S202. At step S203, data is written in a predetermined sector of a test track, on which test writing is performed, other than the test writing inhibited sectors specified in the memory circuit 214.

The data to be written, preferably, is a repetition of a single pattern for easy measurement of the amplitude of a signal generated therefrom subsequently.

At step S204, the drive controller 211 measures the amplitude of a signal generated from reading data written at step S203 by monitoring an output of the amplitude detection circuit 212. At step S205, the drive controller 211 determines whether the amplitude monitored at step S204 is smaller than a predefined lower limit. If the monitored amplitude is smaller, the test writing power level Pt is increase at step S206. At step S207, the drive controller 211 determines whether the increased test writing power level Pt has reached an upper limit Pmax of actual recording power levels. If the test writing power level Pt has reached the upper limit Pmax, error processing is carried out and the procedure is terminated. If the test writing power level Pt has not reached the upper limit Pmax, control is returned to step S203 and test writing is restarted.

At step S205, if the drive controller 211 determines that the monitored amplitude is equal to or larger than the predefined lower limit, control is passed to step S208 where the drive controller 211 determines whether the monitored amplitude falls below a predefined upper limit. If the monitored amplitude exceeds the predefined upper limit, the test writing power level Pt is decreased at step S209. At step S210, the drive controller 211 determines whether the decreased test writing power level Pt has reached a lower limit Pmin of actual recording power levels. If the test writing power level Pt has reached the lower limit Pmin, error processing is carried out and the procedure is terminated. If the test writing power level Pt has not reached the lower limit Pmin, control is returned to step S203 and test writing is restarted. The procedure is repeated in order to determine the test writing power level Pt with which the amplitude of a signal generated from reading written data falls within a predefined range.

If the target value of the amplitude of a signal (means in the predefined range) were too small, an error in measurements of the amplitude due to noise would become significant which is undesirable. By contrast, if the target value of the amplitude were too large, the amplitude of a signal generated from reading written data would be saturated. A variation in amplitude proportional to a variation in writing power level would diminish, increasing an error of the test writing power level Pt,which is not desirable.

Figure 17:
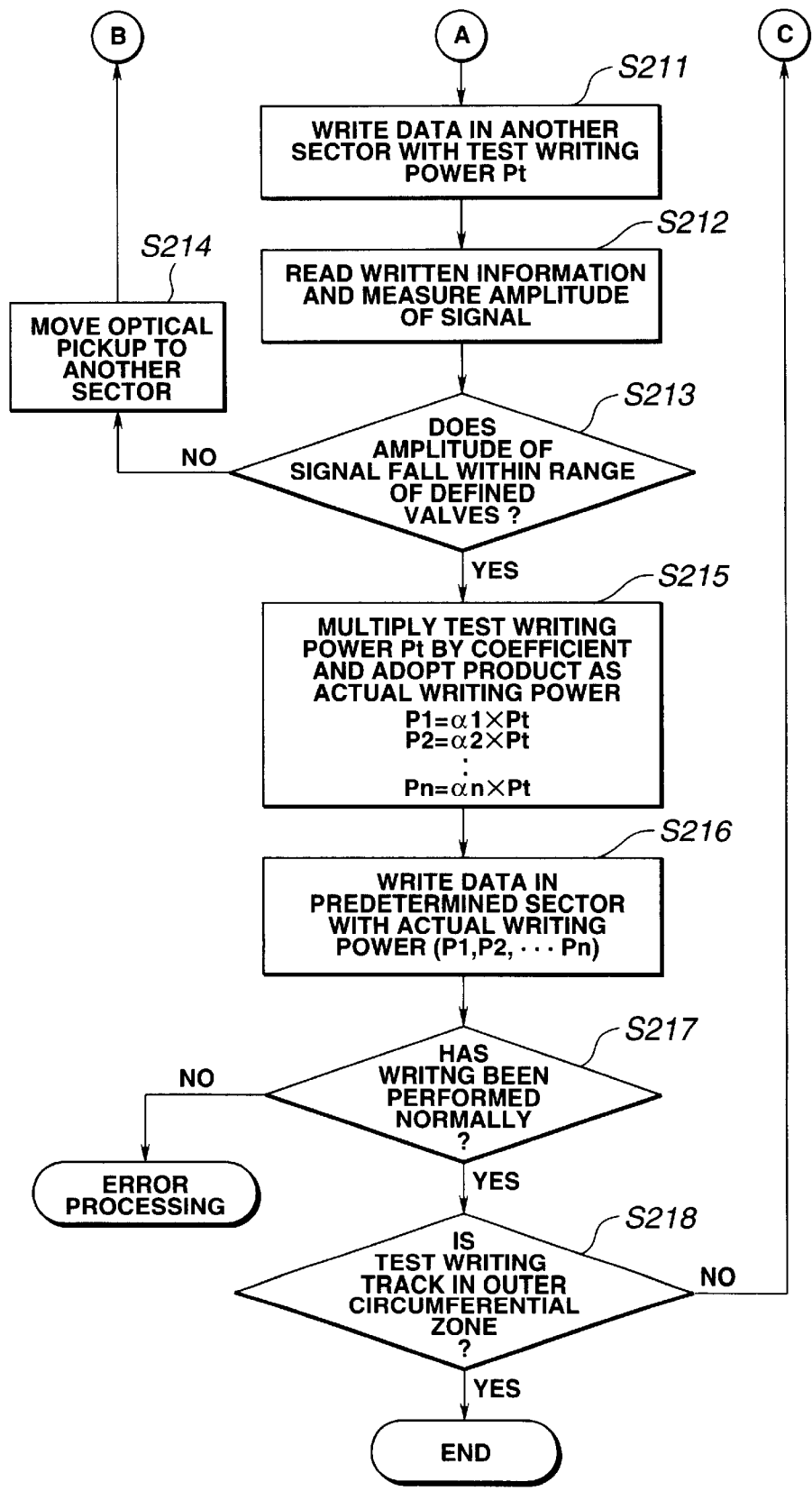

At step S208, if the drive controller 211 determines that the monitored amplitude falls below the predefined upper limit, control is passed to step S211. As described in FIG. 17, data is written in another sector of the test track with the determined test writing power level. The amplitude of a signal generated from reading written data is monitored at step S212. At step S213, the drive controller 211 determines whether the monitored amplitude of the signal generated from reading data written in another sector falls within a range of predetermined values defined with the predefined upper limit and predefined lower limit. If the monitored amplitude falls outside of the range, the optical pickup is moved to another sector, at step S214 and control is returned to step S202 in FIG. 16 where the procedure is repeated.

At step S213, if the drive controller 211 determines that the amplitude falls within the range of predefined values, control is passed to step S215. The recording power level calculation circuit 213 multiplies the test writing power level Pt, which is determined through the foregoing processing steps, by a coefficient, and adopts the product as a recording power level with which data is written.

Figure 18:
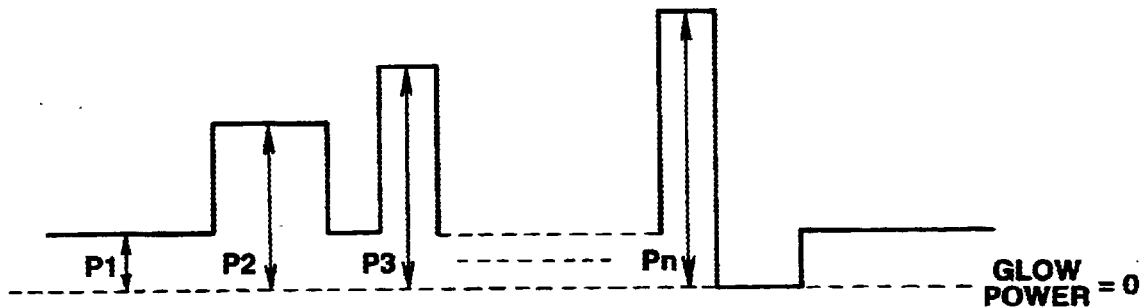

Recording may be performed according to a pulse train, like the one shown in FIG. 18, which exhibits multiple power levels. In this case, the test writing power level Pt is determined for each of the peak power levels of pulses (P1, P2, P3, . . . , Pn), and then multiplied by an associated coefficient (α1, α2, α3, . . . , αn). The coefficients α1, α2, α3, . . . , αn are specified in advance in the recording power level calculation circuit 213.

Referring back to FIG. 17, at step S216, data is written in a predetermined sector with the recording power level set at step S215. At step S217, if writing has not been achieved normally, such as if an error is detected during verification, error processing is carried out and the procedure is terminated. If writing has been achieved normally, at step S218, the drive controller 211 determines whether the test track belongs to zone 16. If the test track belongs to zone 16, the recording power levels for the other zones are set by approximating them linearly relative to the recording power levels for zone 0 and zone 16.

According to the above description, the test track belongs to zone 0. Control returns from step S218 to step S201 in FIG. 16. At step S201, the optical pickup is moved to the test track in zone 16. The foregoing procedure is repeated in order to set the recording power level for zone 16. At step S218, the recording power levels for the other zones are set by approximating them linearly relative to the recording power levels for zone 0 and zone 16. When the test writing power level Pt is determined for zone 16, the value to which the test writing power level Pt is initialized at step S202 is calculated based on the test writing power level Pt determined for zone 0.

The coefficients $\alpha i$, where i denotes any of 1 to n, should preferably be set depending on temperature, a disk format, a track on which test writing is performed, and a type of disk. The type of disk falls into a direct overwriting (DOW) type and a non-direct overwriting (NONDOW) type.

A first example of techniques for determining the coefficients $\alpha i$ will be described by taking, for instance, recording to be performed according to a pulse train exhibiting three power levels P1, P2, and P3.

Figure 19:
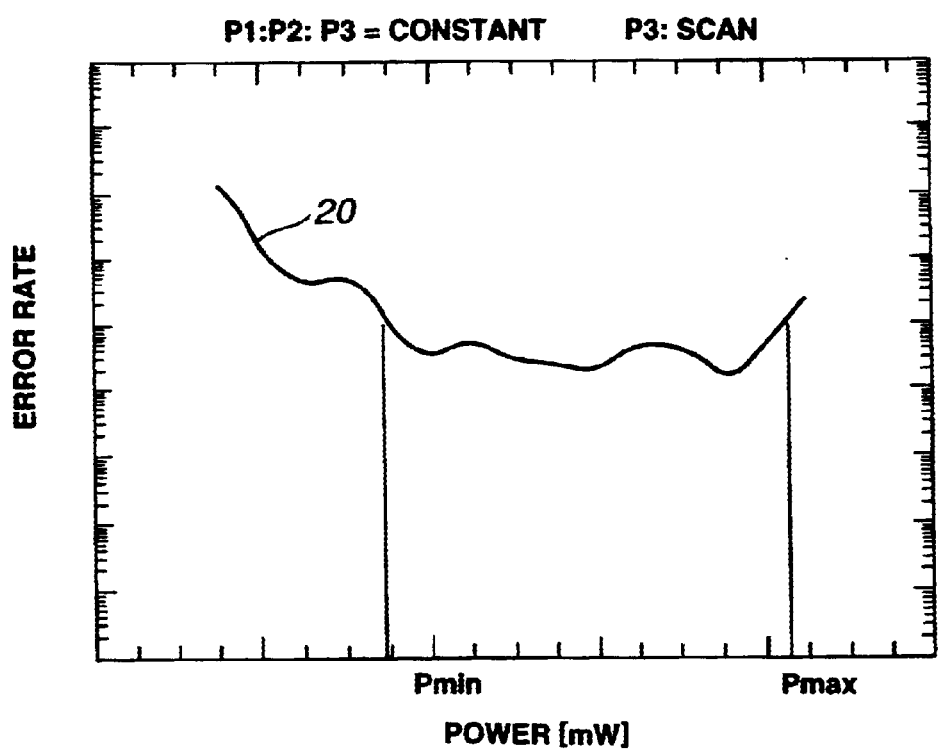

In general, a signal representing data to be recorded on an optical disk is evaluated based on an error rate. When the above three values are variable, the error rate varies. When reading data carried by a signal in an optical disk drive, error correction is carried out. As long as the error rate of a recording signal is of a certain level, the data carried by the signal can be read normally. FIG. 19 graphically shows a variation in error rate, wherein the ratio of P1 to P2 to P3 is constant and the power level P3 is variable. The error rate curve 20 indicates the limits of error rates at which an error can be corrected by performing error correction. A satisfactory recording domain is defined in FIG. 19 as follows:

$$P\min \geq P3 < P\max$$

Hereinafter, the satisfactory recording domain Pmax-Pmin is referred to as the power-related margin of the optical disk drive.

Figure 20:
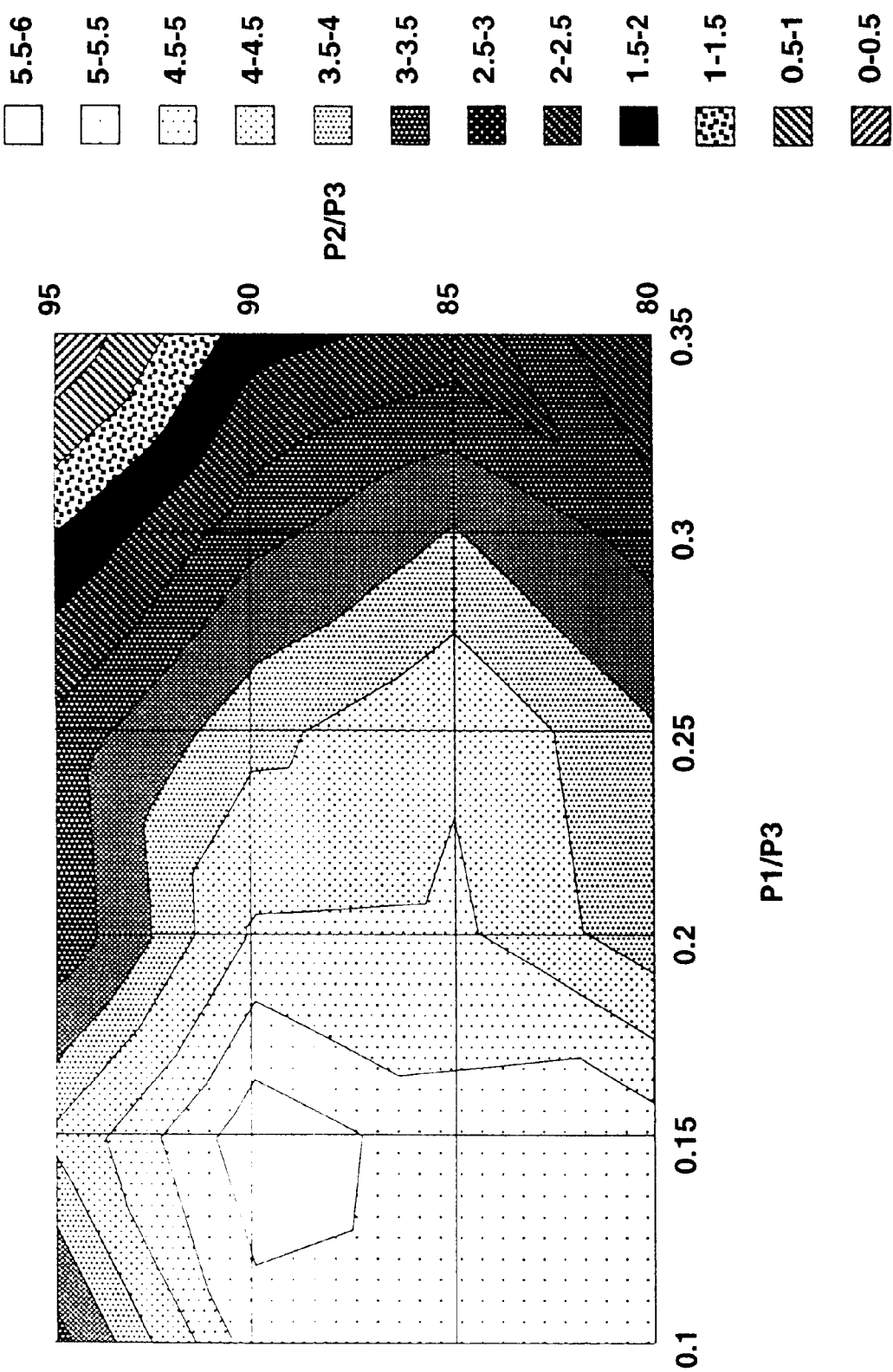

If the ratio of P1 to P2 to P3 is modified, and P3 is varied, then an error rate is measurable. Thus, a power-related margin can be measured relative to each ratio and shown graphically, with the ratio of P1 to P3 on the x axis, the ratio of P2 to P3 on the y axis, and the power-related margin on the z axis, as shown in FIG. 20. In the graph, contour lines linking points of equal values of the power-related margin are drawn in the z-axis direction. The ratio of P1 to P3 and the ratio of P2 to P3, the values of which belong in a domain appearing like a crest or a domain contoured with points indicating the largest power-related margin, shall be expressed as optimal relationship as follows:

$$P1 = a1 \times P3,\ P2 = a2 \times P3$$

where a1 and a2 are constants.

A variation in power level is predictable to occur during recording by the optical disk drive. An error in measurements of the test writing power level Pt, and an error caused by an electrical system in the optical disk drive are estimated as a margin of Pmin. The initial writing power level Pmin of P3, indicated in the error rate graph, defines the largest power-related margin depicted as the crest. The target value of P3 is calculated as follows:

$$P3 = P\min/b$$

where b denotes an error thought to occur during recording by the optical disk drive.

The largest error thought to occur in the optical disk drive may be estimated, therefore b can be defined as a constant.

Assuming that the ratio of Pmin to the test writing power level Pt is c, the following relationship is established:

$$P\min = c \times Pt$$

Pmin and Pt vary depending on the sensitivity in recording on a recording medium. The ratio of Pmin to Pt is expressed using the unique constant c.

Consequently, once the test writing power level Pt is determined, three optimal values of powers P1, P2, and P3 are defined with unique constants $\alpha1$, $\alpha2$, and $\alpha3$ in relation to the test writing power level Pt as follows:

$$P1 = a1 \times c/b \times Pt = \alpha1 \times Pt$$

$$P2 = a2 \times c/b \times Pt = \alpha2 \times Pt$$

$$P3 = c/b \times Pt = \alpha3 \times Pt$$

Accordingly, $\alpha1$, $\alpha2$, and $\alpha3$ individually should be specified in the recording power level calculation circuit 213.

Next, a second example of techniques for determining the coefficients $\alpha i$ will be described. The magneto-optical disk offering 540M bytes or 640M bytes, as provided under ISO/IEC 15041, covers a light modulation direct overwriting type recording type (hereinafter, LIM-DOW) disk. In the LIM-DOW disk, erasure is performed with the power level P1, and recording is performed with the power levels P2 and P3. Thus, recording is achieved by overwriting data without erasure.

Figure 21:
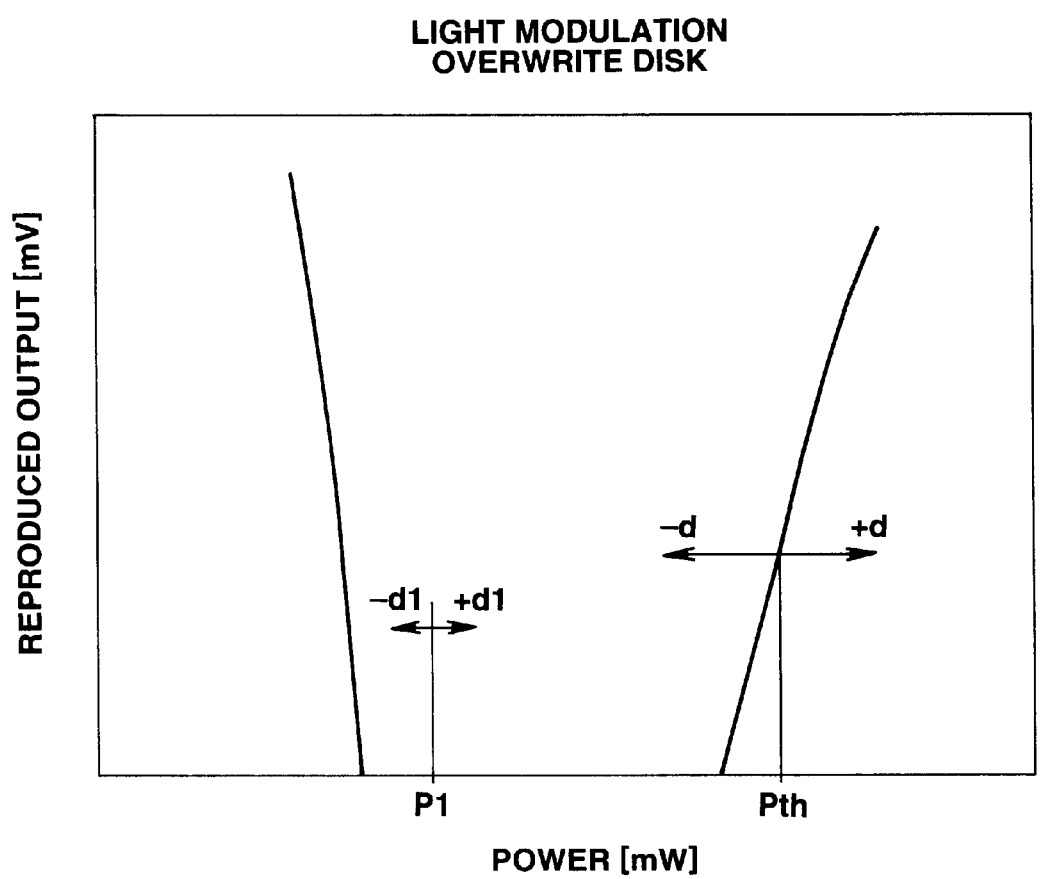

The power level P1 should be set with a margin large enough to enable erasure. This is because erasure is carried out concurrently with optimization of the jitter of a recording signal. FIG. 21 indicates the characteristics of the LIM-DOW disk concerning erasure and recording. The ratio $\alpha1$ of P1 to the test writing power level Pt is assumed constant. Assuming that a variation in test writing power level Pt due to a difference from one disk to another or one optical disk drive to another occurring in the course of manufacturing is ±d, the margin large enough to enable erasure is expressed as follows:

$$\pm d1 = \pm d \times \alpha1$$

It is therefore necessary to ensure that the margin ±d1 large enough to enable erasure is appended to the power level P1.

Figure 22:
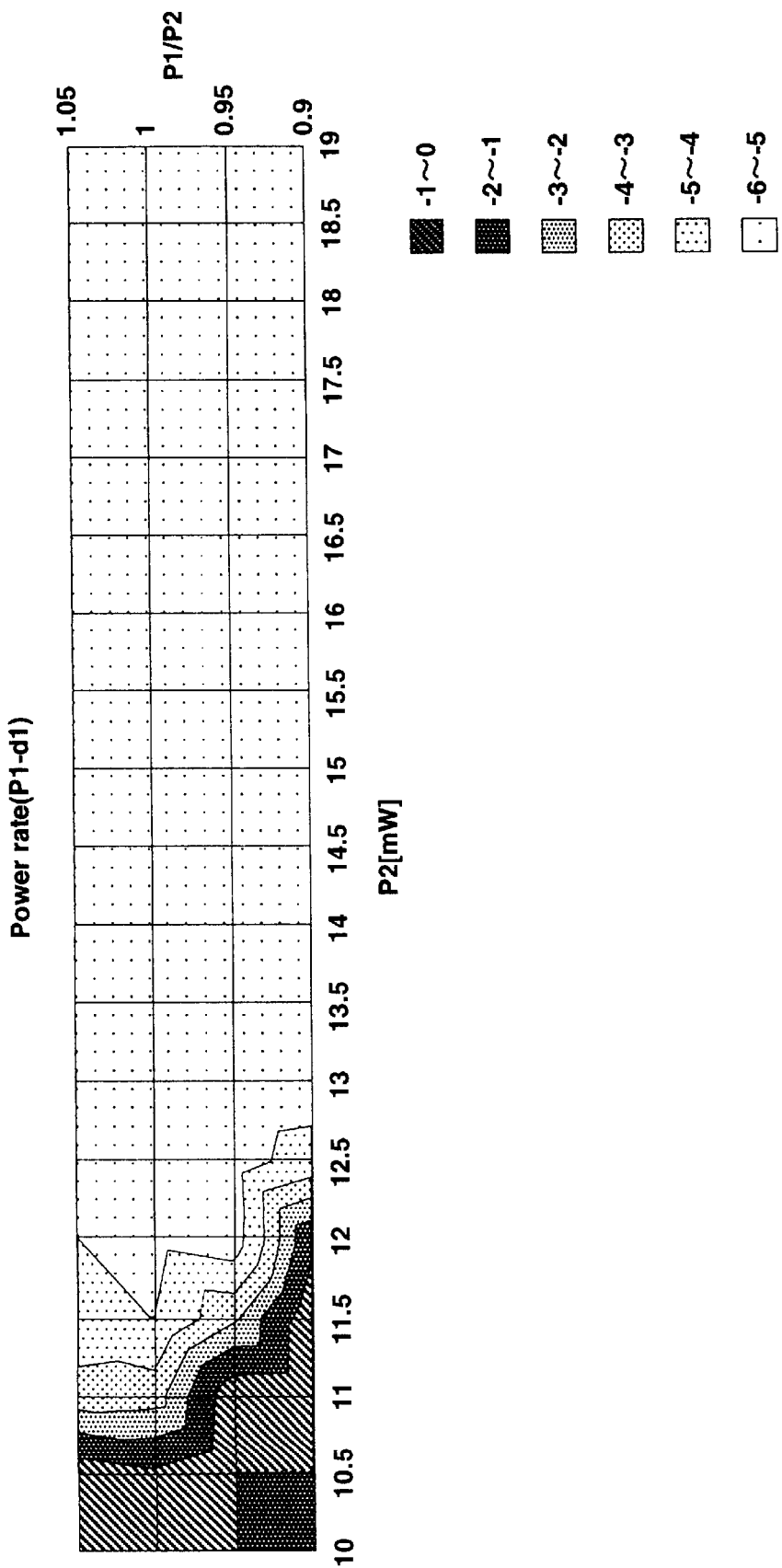
Figure 23:
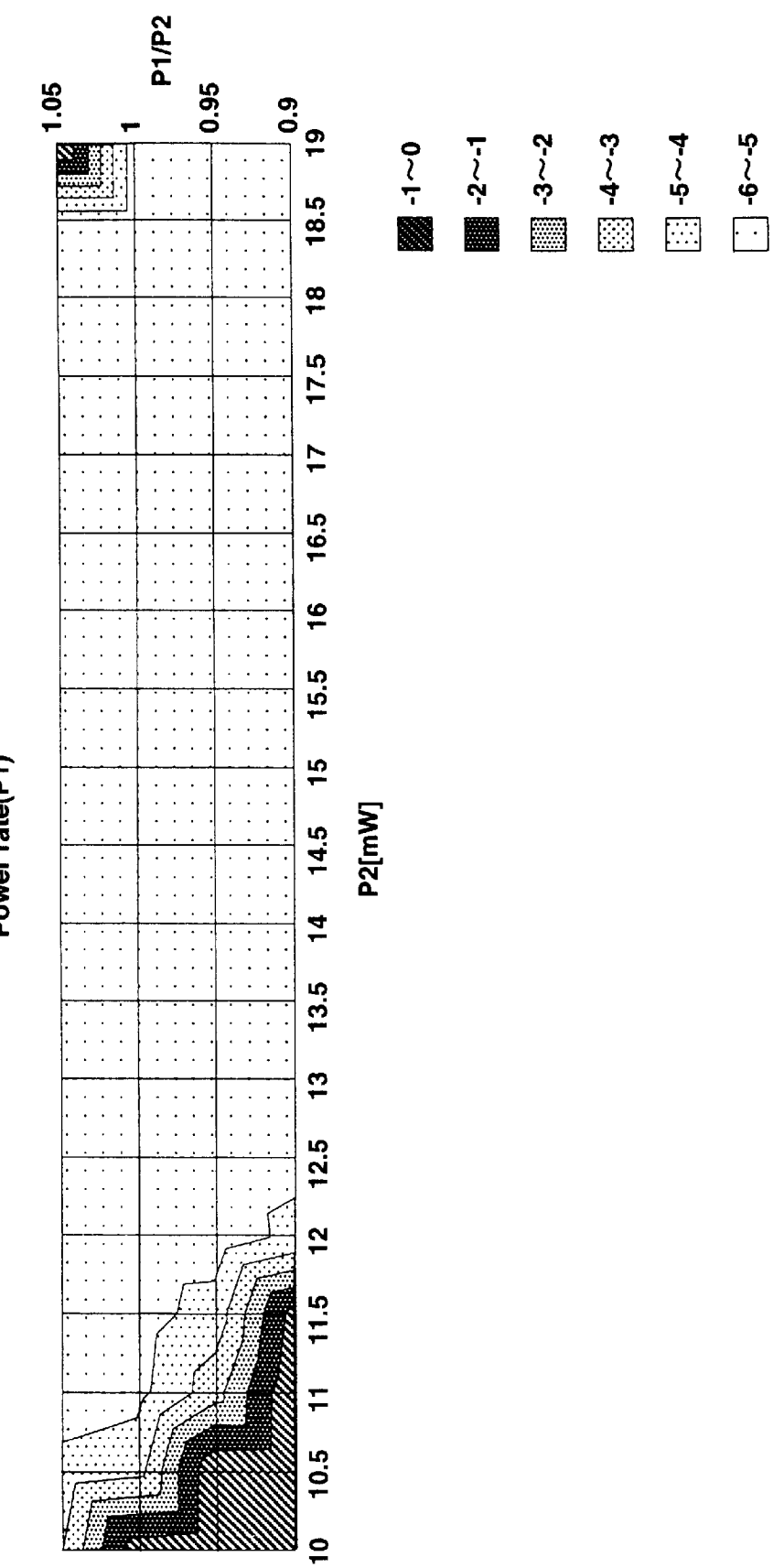
Figure 24:
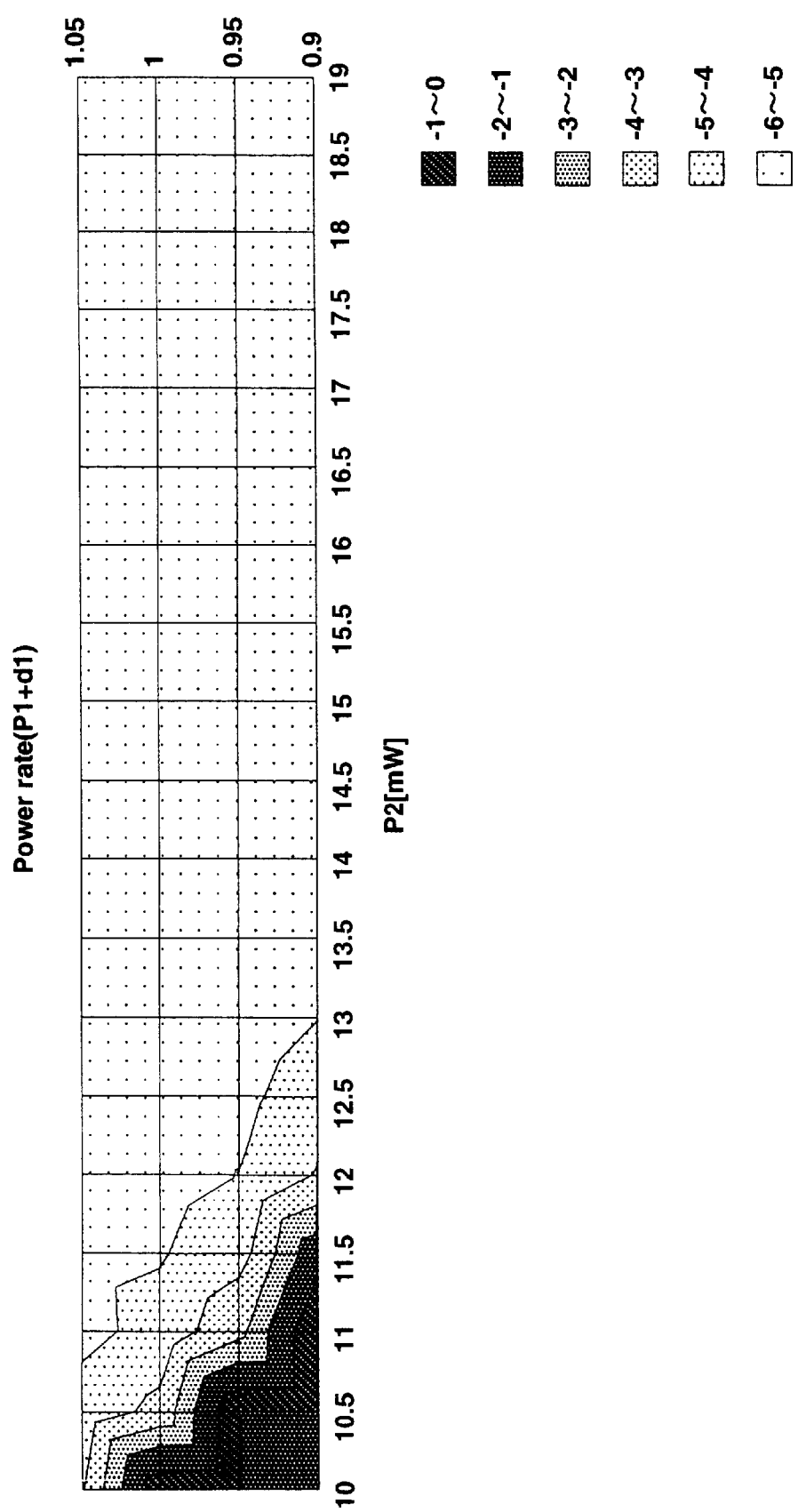

The power-related margin of the optical disk drive is measured relative to P3 by employing P1 or P1+d1 as a fixed value and changing the ratio of P2 to P3, and graphically depicted in FIG. 22 to FIG. 24. The power level P1 associated with a ratio of P2 to P3 providing the largest power-related margin may be ascertained from FIG. 22 to FIG. 24. The power level P1 has a power-related margin when appended with the margin ±d1. Thus, the relationship of P1 to Pt is defined as follows:

$$P1 = \alpha1 \times Pt$$

The relationship of P2 to P3 is optimized as follows:

$$P2 = a2 \times P3$$

When the largest error b of the initial writing value of P3 thought to arise in the optical disk drive is estimated, P3 is expressed as follows:

$$P3 = P\min/b$$

Since the relationship of P3 to Pt depends on sensitivity, the following relationship is established $$P_{min} = c \times Pt$$

Consequently, even with a LIM-DOW disk, similarly to ordinary disks, the three optimal power levels P1, P2, and P3 are defined with the unique constants $\alpha 1$, $\alpha 2$, and $\alpha 3$ in relation to the test writing power level Pt as follows:

$$P1 = \alpha 1 \times Pt$$

$$P2 = a2 \times c/b \times Pt = \alpha 2 \times Pt$$

$$P3 = c/b \times Pt = \alpha 3 \times Pt$$

Thus, $\alpha 1$, $\alpha 2$, and $\alpha 3$ should be stored individually in the recording power level calculation circuit 213.

As mentioned above, according to this embodiment, the amplitude of a reproduced signal generated from reading written information is measured. The test writing power level Pt is determined based on the measured value. The determined test writing power level Pt is multiplied by a predetermined coefficient, whereby a recording power level is set. Consequently, measurement of the amplitude of a signal will not be affected by the irregular sensitivity of a magneto-optical disk or a rotary deviation thereof. Thus, the recording power level for each zone can be set precisely.

The test writing power level Pt is determined by following steps S201 to S210 in FIG. 15. The present invention is not limited to this procedure. Alternatively, the procedure described in FIG. 25 may be adopted.

Figure 25:
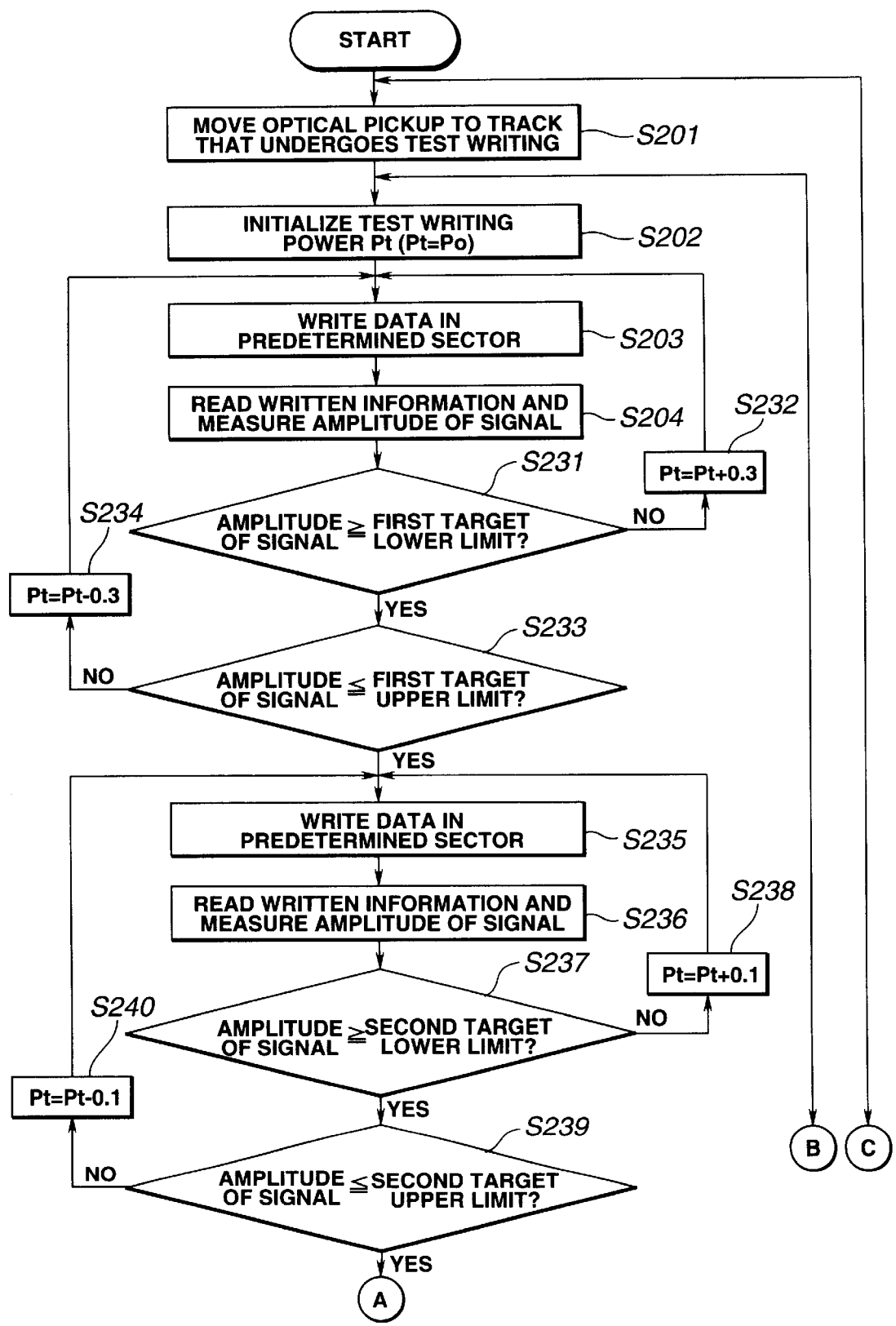

Specifically, as described in FIG. 25, after the processing steps of steps S201 to S204 are completed, at step S231, the drive controller 211 determines whether the amplitude monitored at step S204 is smaller than a first predefined target lower limit. If the monitored amplitude is smaller, the test writing power level Pt is increased by, for example, 0.3 mW at step S232. Control is then returned to step S203 and test writing is restarted.

At step S231, if the drive controller 211 determines that the amplitude monitored at step S204 is equal to or larger than the first predefined target lower limit, control is passed to step S233. The drive controller 211 then determines whether the monitored amplitude falls below a first predefined target upper limit. If the monitored amplitude exceeds the first target upper limit, the test writing power level Pt is decreased by, for example, 0.3 mW at step S234. Control is returned to step S203 and test writing is restarted.

At step S233, if the drive controller 211 determines that the monitored amplitude falls below the first predefined upper limit, control is passed to step S235. Data is then written in a predetermined sector with the test writing power level Pt falling within a range from the first target lower limit to the first target upper limit. At step S236, the amplitude of a signal carrying data written at step S235 is measured by monitoring an output of the amplitude detection circuit 212. At step S237, the drive controller 211 determines whether the monitored amplitude is smaller than a second predefined target lower limit that is larger than the first predefined target lower limit. If the monitored amplitude is smaller, the test writing power level Pt is increased by, for example, 0.1 mW at step S238. Control then is returned to step S235 and test writing is restarted.

At step S237, if the drive controller 211 determines that the amplitude monitored at step S236 is equal to or larger than the second predefined target lower limit, control is passed to step S239. The drive controller 211 then determines whether the monitored amplitude falls below a second target upper limit that is smaller than the first predefined target upper limit. If the monitored amplitude exceeds the second target upper limit, the test writing power level Pt is decreased by, for example, 0.1 mW at step S240. Control is then returned to step S235 and test writing is restarted. This procedure is repeated in order to determine the test writing power level Pt with which the amplitude of a signal generated from reading written data falls within a range of predefined values. Thereafter, control is passed to step S211 described in conjunction with FIG. 16.

According to the procedure described in FIG. 25, the test writing power level Pt is determined in two stages according to a range of amplitudes. Thus, test writing power level Pt can be determined quickly.

The third embodiment is substantially identical to the second embodiment. Only a difference from the second embodiment will be described. The same reference numerals will be assigned to the same components. The description of the components will be omitted.

Figure 26:
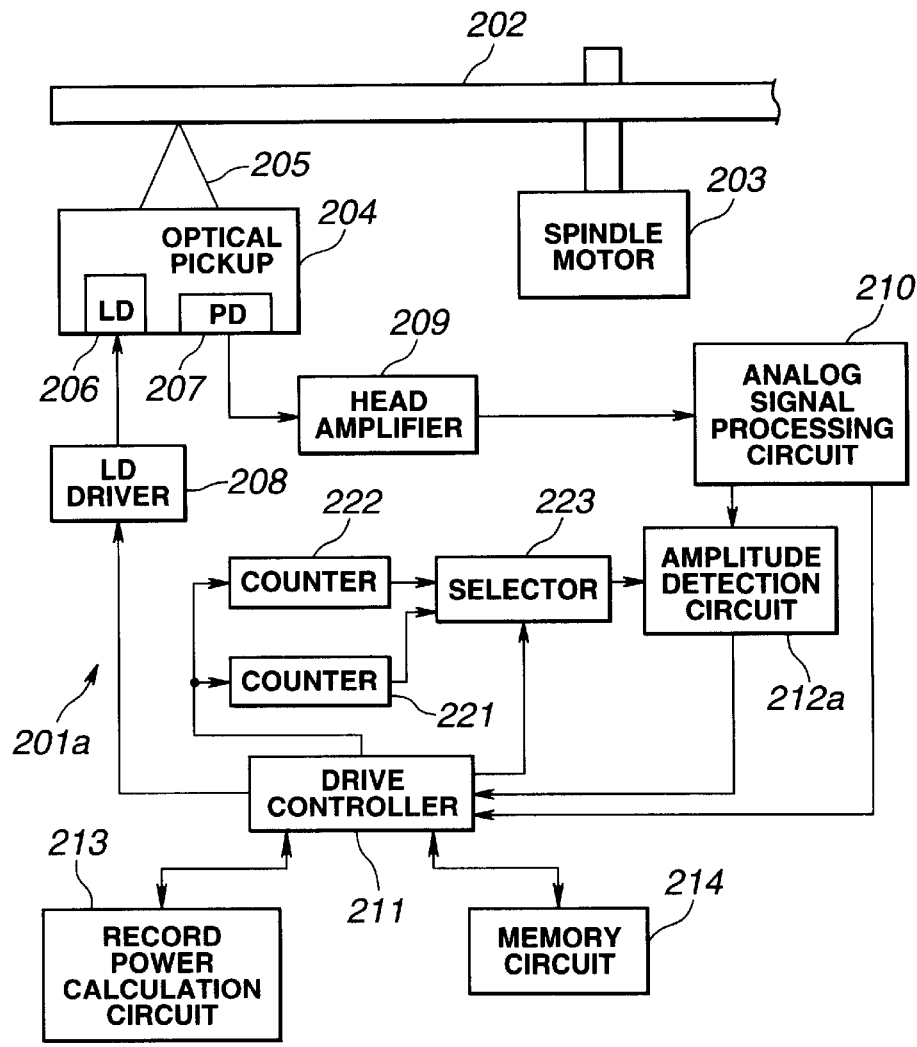
FIG. 26 and FIG. 27 relate to the third embodiment of the present invention.
Figure 27:
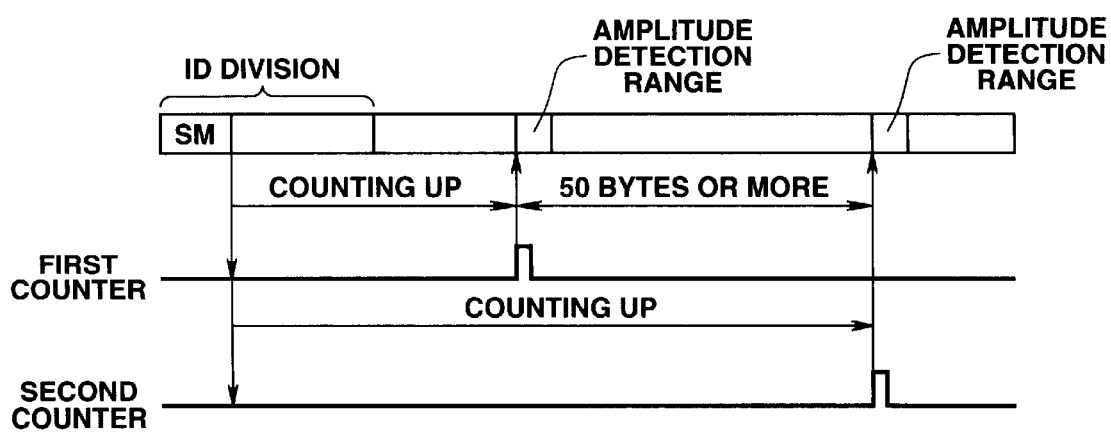

As shown in FIG. 26, a magneto-optical disk drive 201 a of this embodiment has a first counter 221, a second counter 222, and a selector 223. The first counter 221 and second counter 222 count up to a predetermined value in response to the sector mark (SM) of a sector issued by the drive controller 211. The selector 223 outputs a count signal sent from the first counter 221 or second counter 222 to an amplitude detection circuit 212 a under the control of the drive controller 211. The amplitude detection circuit 212 a detects the amplitude of a signal in response to the count signal produced by the first counter 221 or second counter 222 and sent by the selector 223.

For test writing, the drive controller 211 outputs a triggering signal to the first counter 221 and second counter 222 when reading a sector mark. The first counter 221 counts up over a first time, and outputs a count signal to the selector 223. The second counter 222 counts up over a second time longer than the first time, and outputs a count signal to the selector 223. A current sector of a test track may be included in the test writing inhibited sectors (See Tables 1 and 2) specified in the memory circuit 214. In this case, the drive controller 211 controls the selector 223 so that the selector 223 will select the count signal produced by the second counter 222. By contrast, the current sector may not be included in the test writing-inhibited sectors specified in the memory circuit 214. In this case, the drive controller 211 controls the selector 223 so that the selector 223 will select the count signal produced by the first counter 221. This causes the amplitude detection circuit 212 a to measure the amplitude of a signal representing data written in a data recording division separated by a predetermined distance from an identification division in which the sector mark is specified.

The other constituent features and operations are identical to those provided by the second embodiment.

As mentioned above, according to this embodiment, similarly to the second embodiment, the influence of a signal representing data written in an identification division of an adjoining buffer track can be eliminated. In addition, it is possible to measure the amplitude of a signal representing data written in an affected sector. Eventually, measurement can be achieved effectively.

Figure 28:
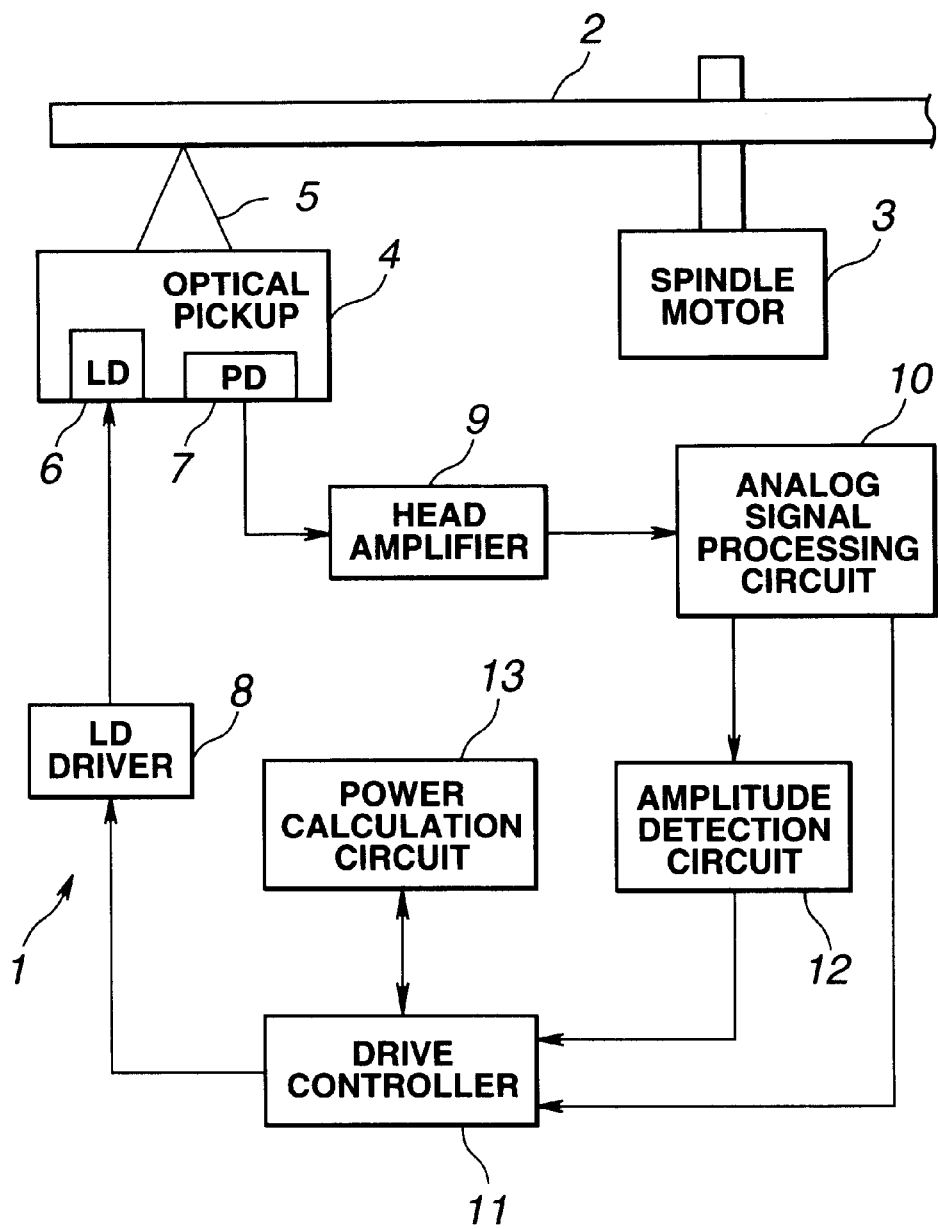

As shown in FIG. 28, a magneto-optical disk 2 on which information is magneto-optically recorded is inserted into a magneto-optical disk drive 1 of this embodiment. The magneto-optical disk 2 is loaded on a spindle motor 3 by a loading mechanism (not shown), and driven to rotate. An optical pickup 4 serving as an optical head is located near the spindle motor 3 so that the optical pickup 4 can be moved radially relative to the magneto-optical disk 2. The optical pickup 4 irradiates laser light 5, used for recording and reproducing data, onto the magneto-optical disk 2.

The optical pickup 4 has a laser diode (LD) 6 for emitting the laser light 5, and a photo-detector (PD) 7 for receiving light reflected from the magneto-optical disk 2. The optical pickup 4 further includes an optical system (not shown) for narrowing the laser light 5 so that the laser light will produce a microscopic spot of emitted laser light. The optical system irradiates light reflected from the magneto-optical disk 2 to the photo-detector 7.

A laser diode driver 8 is connected to the laser diode 6. A driving current is supplied from the laser diode driver 8 to the laser diode 6. An analog signal processing circuit 10 is connected to the photo-diode 7 via a head amplifier 9. An output signal of the photo-diode 7 is amplified by the head amplifier 9, and then coded in a binary format by the analog signal processing circuit 10.

The binary signal produced by the analog signal processing circuit 10 is sent to the drive controller 11. The drive controller 11 demodulates the signal and corrects any errors in the signal. Data represented by the resultant signal is read as data recorded on the magneto-optical disk 2. The read data is sent to a host computer (not shown), and subjected to various kinds of processing.

The amplitude detection circuit 12 detects the peak value of the output signal of the photo-detector 7 amplified by the head amplifier 9. The peak value detected by the amplitude detection circuit 12 is read into the drive controller 11, and compared with a target value suitable for binary-coding of the detected signal. The gain of a variable gain amplifier (not shown) is adjusted accordingly. The analog signal processing circuit 10 codifies a signal on a stable basis in a binary format.

A power level calculation circuit 13 is connected to the drive controller 11. Under the control of the drive controller 11, the power level calculation circuit 13 determines a test writing power level with which test writing is performed on a test track on the magneto-optical disk 2. Based on the test writing power level, the power level calculation circuit 13 calculates, for example, an actual erasure power level with which data is erased from each zone on the magneto-optical disk 2.

A focusing means and tracking means (not shown) are included in the magneto-optical disk drive 1.

The magneto-optical disk 2 is, for example, a medium offering 540M bytes, and, as shown in FIGS. 29A–D, segmented into eighteen zones ranging from zone 0 to zone 17, as provided under ISO/IEC 15041. Each zone is composed of a user area, buffer tracks, and a test track. The user area is used to record data. The buffer tracks border adjoining zones. The test track is interposed between the outer circumference of the user area and one of the buffer tracks. In general, test writing is performed on the test track in order to set a recording power level for a magneto-optical disk. According to this embodiment, test writing is performed on the test track in zone 0, that is, an inner circumferential zone, in order to set an erasure power level for zone 0. Thereafter, test writing is performed on the test track in zone 16, that is, an outer circumferential zone, in order to set an erasure power for zone 16. The erasure power levels for the other zones are set by approximating them linearly relative to the erasure power levels for zone 0 and zone 16.

As mentioned above, in this embodiment, test writing is performed on zone 0 and zone 16. The present invention is not limited to this mode. Alternatively, test writing may be performed on only one zone, for example, zone 0. The erasure power levels for the other zones may then be set by approximating them linearly relative to a set erasure power level. In this case, the time required for setting the erasure power levels can be shortened. Test writing may be performed on one or a plurality of zones other than zones 0 and 16. In this case, the erasure powers for the zones can be set precisely.

Next, an operation of this embodiment having the foregoing features will be described. Namely, a description will be made of a procedure of setting an erasure power level through test writing which is implemented in the magneto-optical disk drive 1 of this embodiment.

To begin with, the magneto-optical disk 2 is loaded in the magneto-optical disk drive 1. As described in FIG. 30, the drive controller 11 moves the optical pickup 4 to a test track, on which test writing is performed, at step S1. The test track is in zone 0 (See FIG. 29).

Thereafter, the test writing power level Pt is initialized to a predetermined value at step S2. Data is written in a predetermined sector of the test track, on which test writing is performed, at step S3.

Herein, the written data, preferably, is a repetition of a single pattern for easy measurement of the amplitude of a signal generated therefrom subsequently.

At step S4, the drive controller 11 measures the amplitude of a signal generated from reading data written at step S3 by monitoring an output of the amplitude detection circuit 12. At step S5, the drive controller 11 determines whether the amplitude monitored at step S4 is smaller than a predefined lower limit. If the monitored amplitude is smaller, the test writing power level Pt is increased at step S6. At step S7, the drive controller 11 determines whether the increased test writing power level Pt has reached an upper limit Pmax of actual erasure power levels. If the test writing power level Pt has reached the upper limit Pmax, error processing is carried out and the procedure is terminated. If the test writing power level Pt has not reached the upper limit Pmax, control is returned to step S3 and test writing is restarted.

If the drive controller 11 determines that the amplitude monitored at step S5 is equal to or larger than the predefined lower limit, control is passed to step S8. The drive controller 11 then determines whether the monitored amplitude falls below a predefined upper limit. If the monitored amplitude exceeds the predefined upper limit, the test writing power level Pt is decreased at step S9. At step S10, the drive controller 11 determines whether the decreased test writing power level Pt has reached a lower limit Pmin of actual erasure power levels. If the test writing power level Pt has reached the lower limit Pmin, error processing is carried out and the procedure is terminated. If the test writing power has not reached the lower limit Pmin, control is returned to step S3 and test writing is restarted. This procedure is repeated in order to determine the test writing power level Pt with which the amplitude of a signal generated from reading written data falls within a predefined range.

If the target value of the amplitude of a signal (means of the predefined range) were too small, an error in measurements of the amplitude due to noise would become significant, which is not desirable. By contrast, if the target value of the amplitude were too large, the amplitude of a signal generated from reading written data would be saturated. A variation in amplitude proportional to a variation in writing power level would diminish, increasing an error in measurements of the amplitude significantly, which is not desirable.

At step S8, if the drive controller 11 determines that the monitored amplitude falls below the predefined upper limit, data is, as described in FIG. 31, written in another sector of the test track with the test writing power level determined at step S11. The amplitude of a signal generated from reading the written data is monitored at step S12. At step S13, the drive controller 11 determines whether the amplitude of the signal generated from reading the data written in another sector falls within a range of predefined values defined with the predefined upper limit and predefined lower limit. If the amplitude falls outside of the range, the optical pickup is moved to another sector, at step S14 control is returned to step S2 in FIG. 30 and the procedure is repeated.

At step S13, if the drive controller 11 determines that the amplitude falls within the range of predefined values, control is passed to step S15. The power level calculation circuit 13 multiplies the test writing power level Pt which is determined through the above processing, by a coefficient, and adopts the product as an erasure power level with which data is actually erased.

Figure 32:
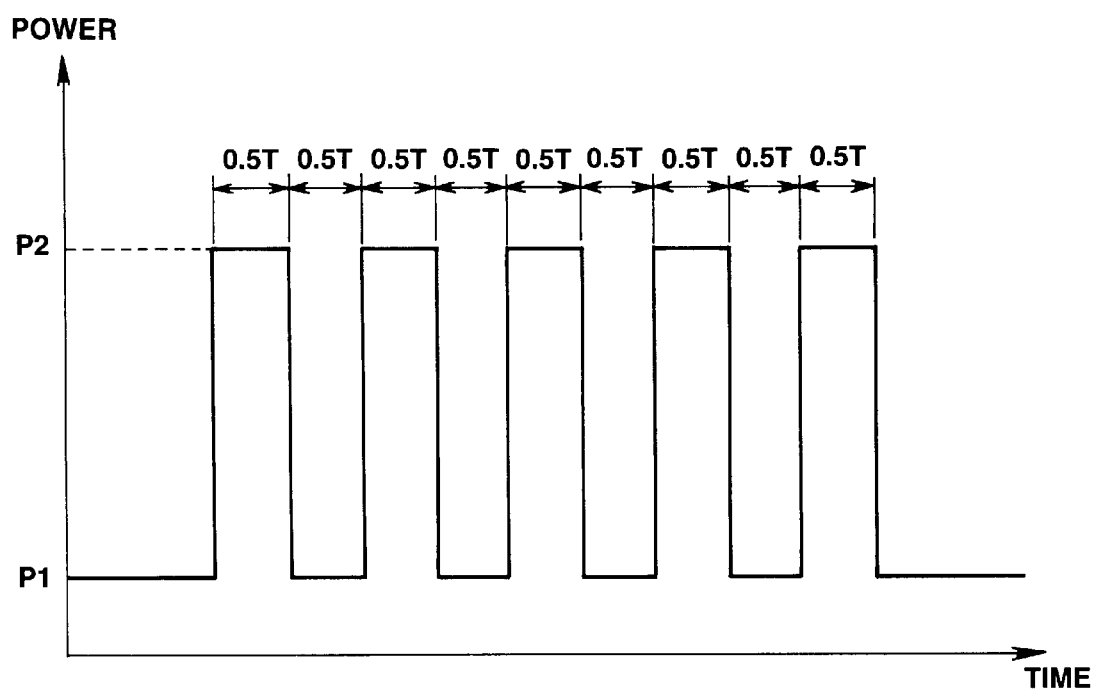

In this embodiment, as shown in FIG. 32, an erasure power level with which data is actually erased falls into two values of a base power level P1 and a peak power level P2 exhibited by a pulse train having a duty ratio of 50%. The base power level P1 and peak power level P2 are calculated by multiplying the determined test writing power level Pt by coefficients ($\alpha 1$ and $\alpha 2$). The coefficients $\alpha 1$ and $\alpha 2$ are specified in the power level calculation circuit 13 in advance.

Referring back to FIG. 31, at step S16, the drive controller 11 determines whether the test track belongs to zone 16. If the test track belongs to zone 16, the erasure power levels for the other zones are set by approximating them linearly relative to the erasure power levels for zone 0 and zone 16.

According to the above description, the test track belongs to zone 0. Control returns from step S16 to step S1 in FIG. 30. The optical pickup is moved to the test track in zone 16, at step S1. The foregoing procedure is repeated in order to set an erasure power level for zone 16. The erasure power levels for the other zones are set by approximating them linearly relative to the erasure power levels for zone 0 and zone 16. The procedure is then terminated. For zone 16, the value to which the test writing power level Pt is initialized at step S2 is calculated based on the test writing power level Pt determined for zone 0.

As mentioned above, according to this embodiment, the amplitude of a reproduced signal generated from reading written information is measured. The test writing power level Pt is determined based on the measured value. The determined test writing power level Pt is multiplied by a predetermined coefficient in order to set an erasure power level. Measurement of the amplitude of a signal will not be affected by the irregular sensitivity of a magneto-optical disk or a rotary deviation thereof. Erasure power levels for the zones can be set precisely.

An erasure power level falls into two power levels exhibited by a pulse train. The erasure power level can be controlled precisely, thus preventing occurrence of cross erasure on tracks arranged at a high density.

Figure 30:
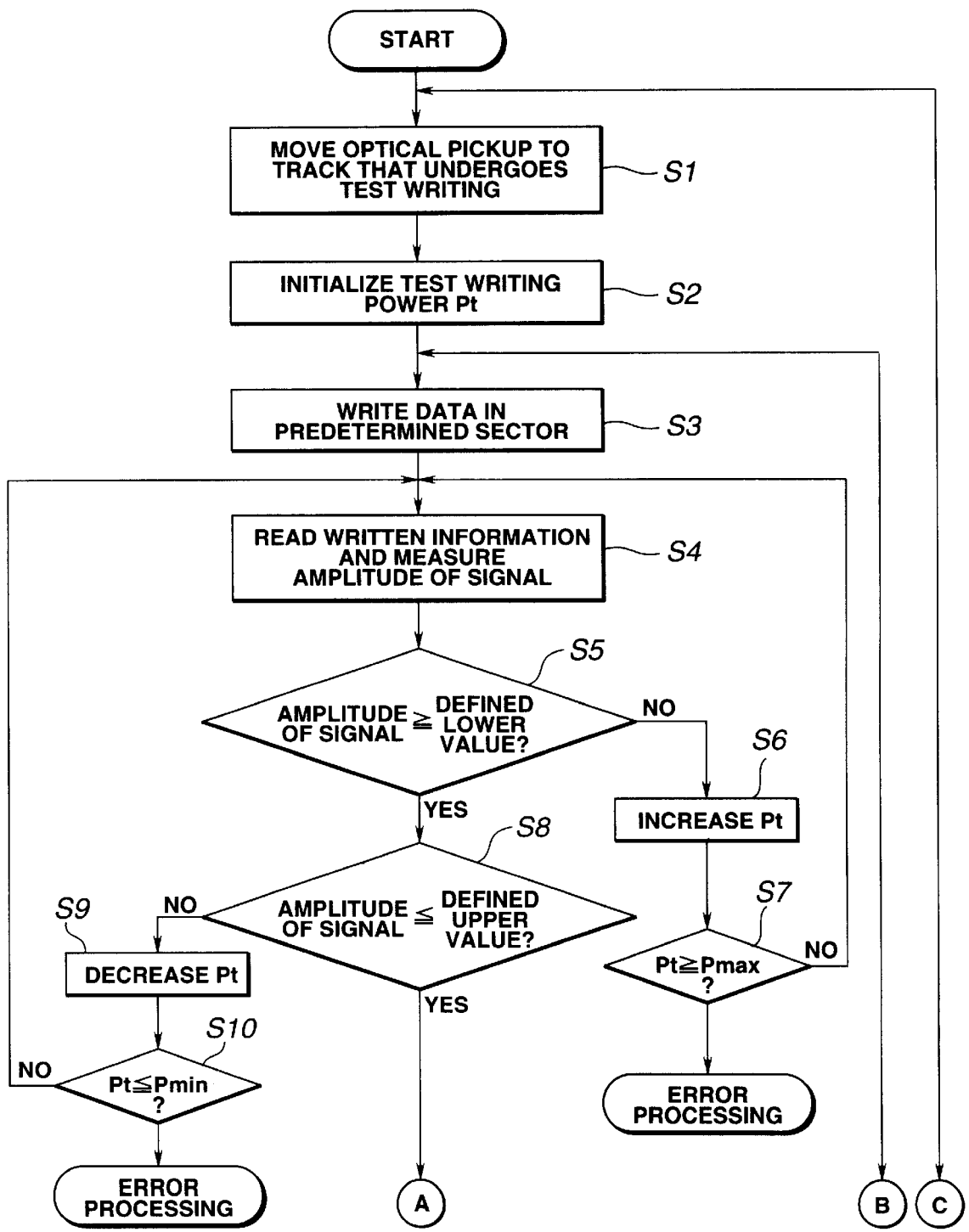
Figure 31:
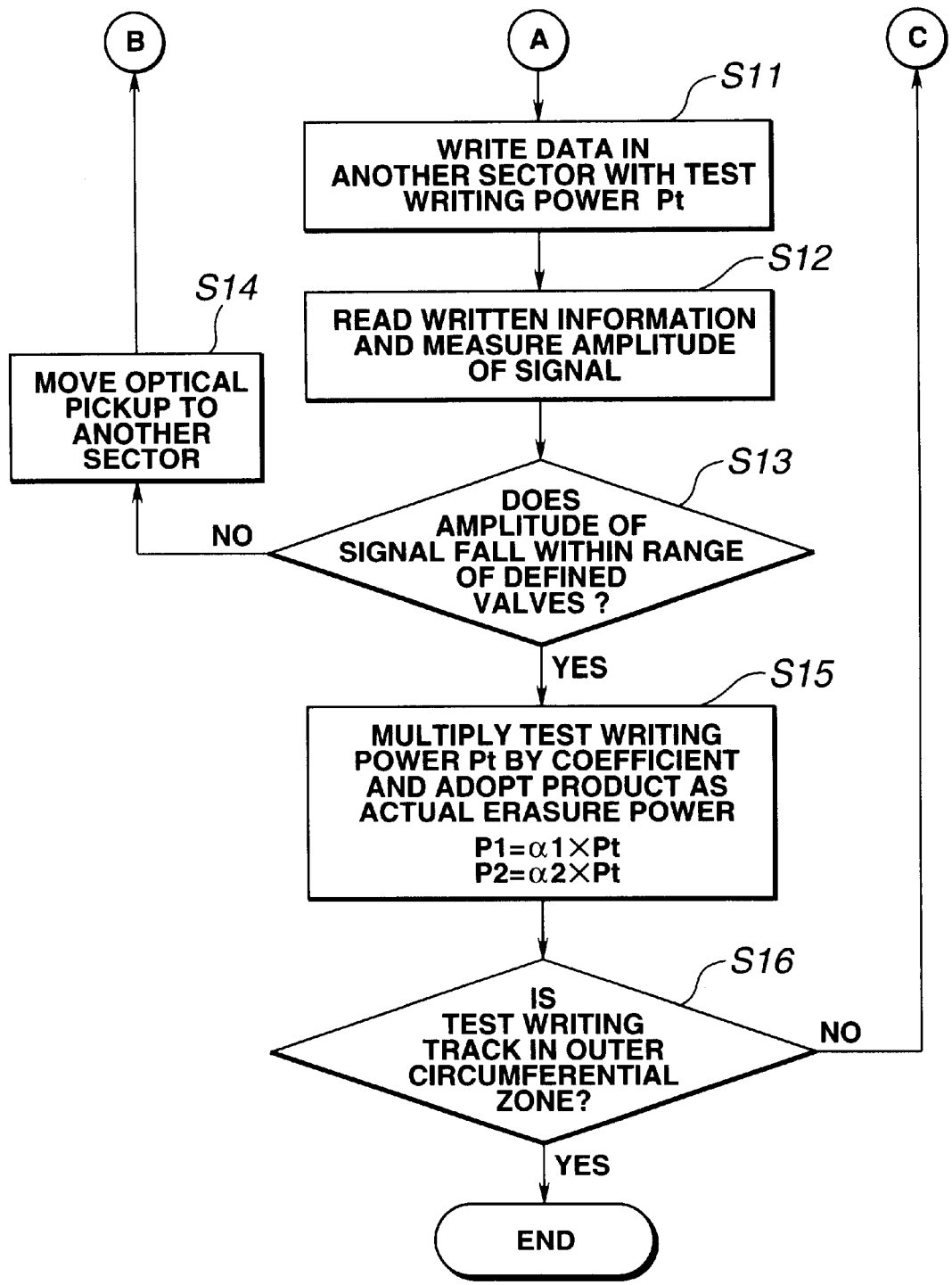

An erasure power level is set according to the flowcharts of FIG. 30 and FIG. 31. Alternatively, the erasure power level may be set according to the flowcharts of FIG. 33 and FIG. 34.

Figure 33:
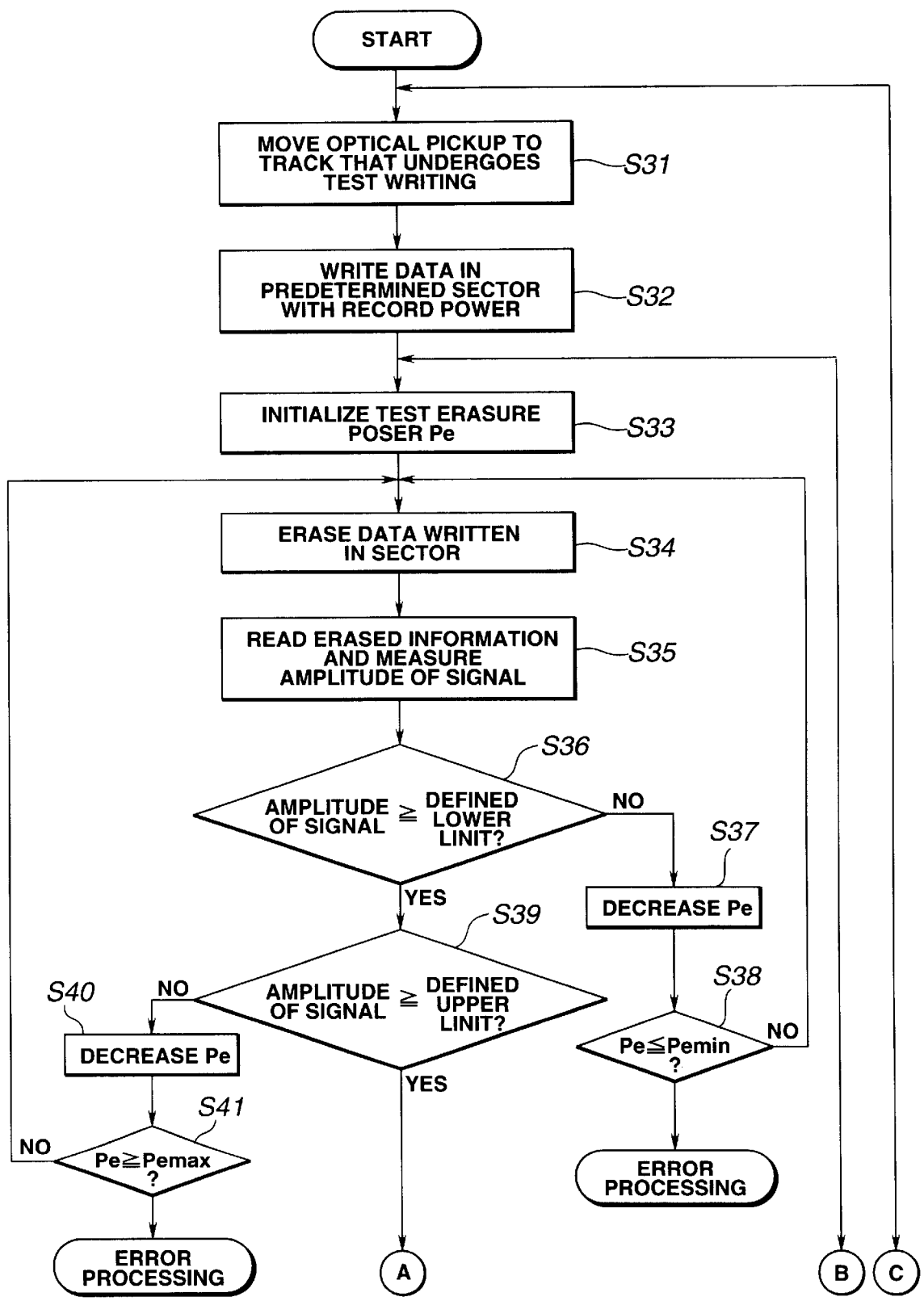
Figure 34:
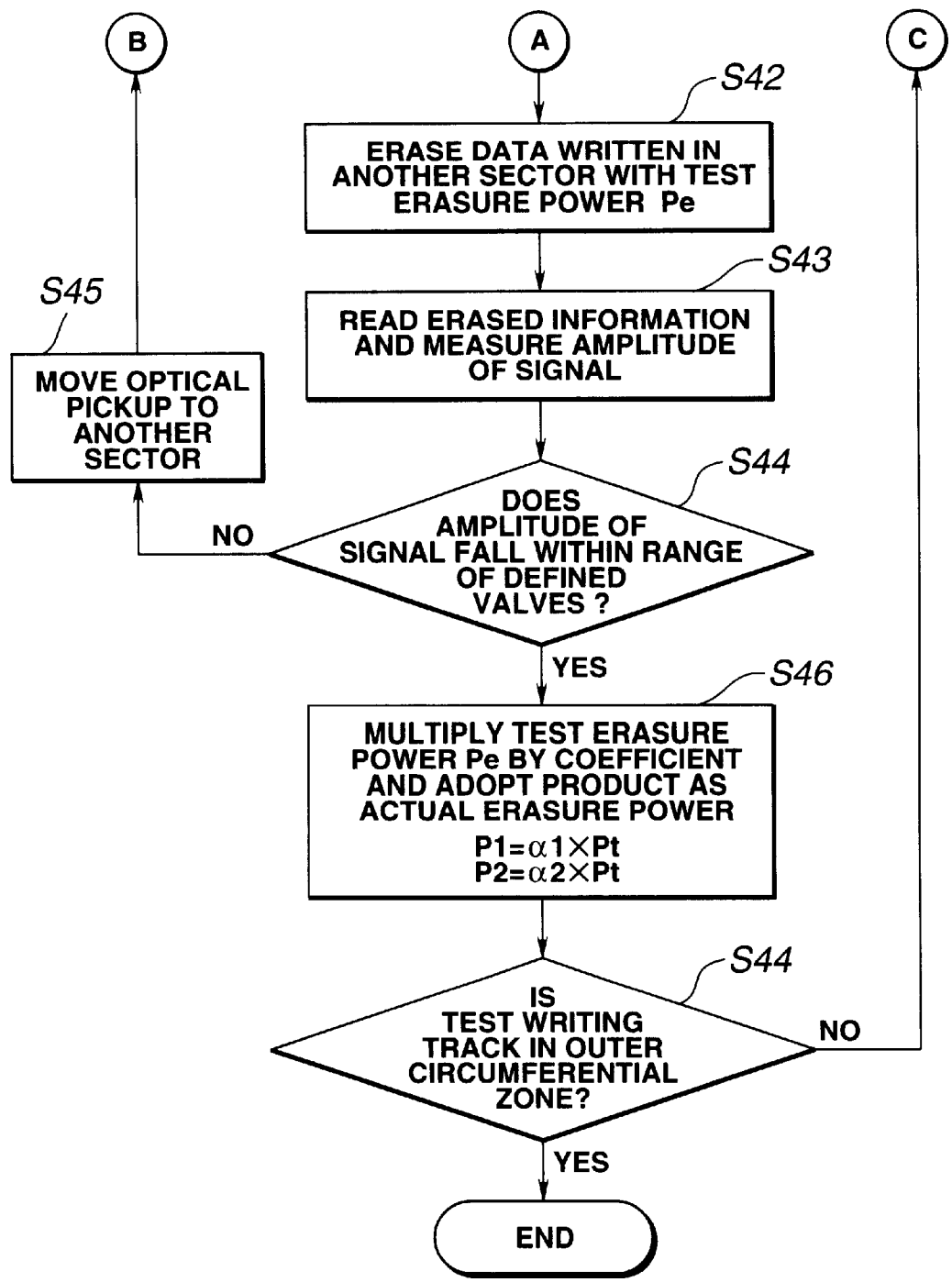
Figure 35:
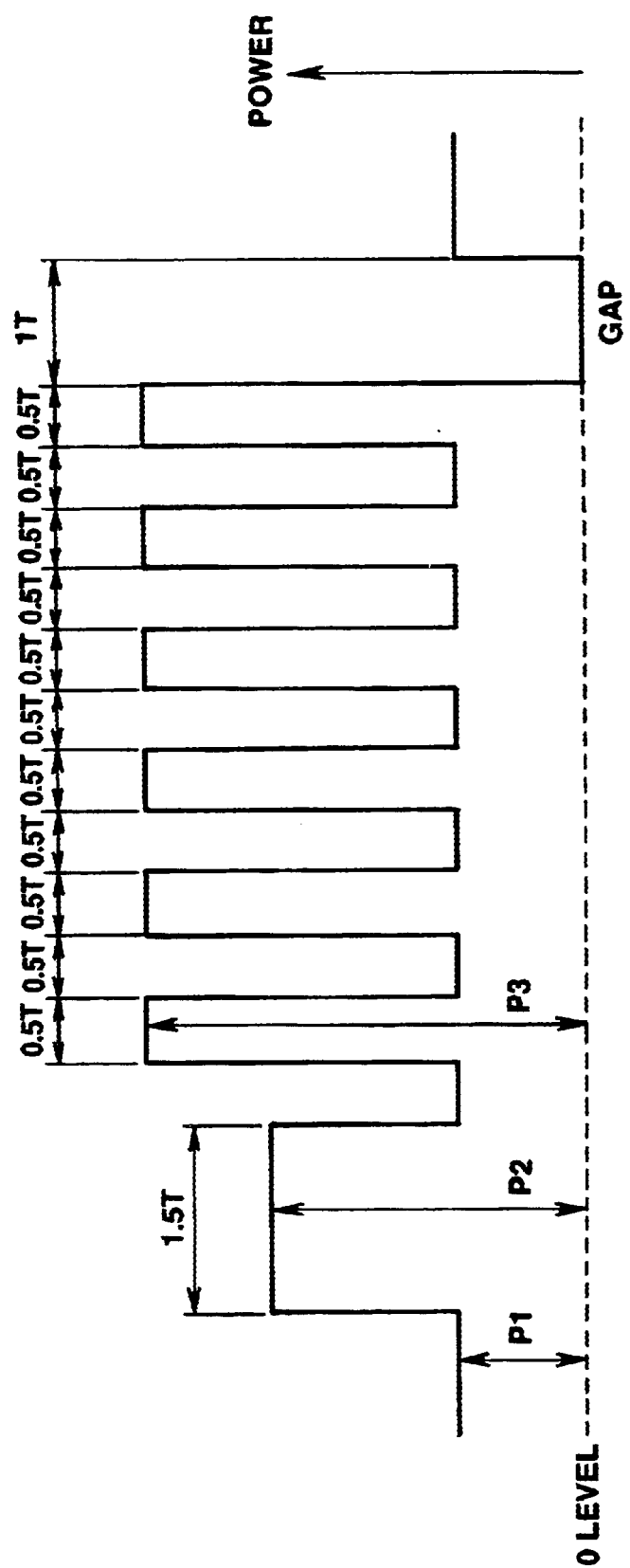
FIG. 35 is a graphical view of a waveform of a pulse train exhibiting recording power levels according to conventional recording.

As described in FIG. 33, the drive controller 11 moves the optical pickup to a test track, on which test writing is performed, at step S 31. The test track is in zone 0 (See FIG. 29).

Thereafter, at step S32, data is written in a sector with a predetermined recording power level or a recording power level set through test writing. A test erasure power level Pe is initialized to a predetermined value at step S33. Data written in the sector with the recording power level is erased at step S34.

The drive controller 11 measures the amplitude of a signal generated from reading the data erased at step S34 by monitoring an output of the amplitude detection circuit 12. At step S36, the drive controller 11 determines whether the amplitude monitored at step S35 is smaller than a predefined lower limit. If the monitored amplitude is smaller than the predefined lower limit, the test erasure power level Pe is too high and therefore decreased at step S37. At step S38, the drive controller 11 determines whether the decreased test erasure power level Pe is equal to or lower than a lower limit Pemin of actual erasure power levels. If the test erasure power level Pe is equal to or lower than the lower limit Pemin, error processing is carried out and the procedure is terminated. If the test erasure power level Pe is not equal to or lower than the lower limit Pemin, control is returned to step S34 and erasure is restarted.

At step S36, if the drive controller 11 determines that the monitored amplitude is equal to or larger the predefined lower value, control is passed to step S39. The drive controller 11 then determines whether the monitored amplitude falls below a predefined upper limit. If the monitored amplitude exceeds the predefined upper limit, the test erasure power level Pe is too large and therefore decreased at step S40. At step S41, the drive controller determines whether the decreased test erasure power level Pe has reached an upper limit Pemax of actual erasure power levels. If the test erasure power level Pe has reached the upper limit Pemax, error processing is carried out and the procedure is terminated. If the test erasure power level Pe has not reached the upper limit Pemax, control is returned to step S34 and erasure is restarted. The procedure is repeated, whereby the test erasure power level Pe is determined so that the amplitude of a signal generated from reading erased data will fall within a predefined range.

At step S39 if the drive controller 11 determines that the monitored amplitude falls below the predefined upper limit, control is passed to step S42. Data written in another sector of the test track with the set test erasure power level is erased as described in FIG. 34. The amplitude of a signal generated from reading the erased data is monitored at step S43. At step S44, the drive controller 11 determines whether the monitored amplitude of the signal generated from reading the data written in another sector falls within a range of predefined values defined with the predefined upper limit and the predefined lower limit. If the amplitude falls outside the range, the optical pickup is moved to another sector at step S45. Control is returned to step S33 in FIG. 33 and the procedure is repeated.

At step S44, if the drive controller 11 determines that the amplitude falls within the range of predefined values, control is passed to step S46. The power level calculation circuit 13 multiplies the test erasure power level Pe determined through the foregoing procedure by a coefficient, and adopts the product as an erasure power level with which data is actually erased.

Thereafter, at step S47, the drive controller 11 determines whether the test track belongs to zone 16. If the test track belongs to zone 16, the erasure power levels for the other zones are set by approximating them linearly relative to the erasure power levels for zone 0 and zone 16. The procedure is then terminated.

According to the above description, the test track belongs to zone 0. Control returns from step S47 to step S31 in FIG. 33. The optical pickup is moved to the test track in zone 16 at step S31. The foregoing procedure is repeated in order to set an erasure power level for zone 16. At step S16, the erasure power levels for the other zones are set by approximating them linearly relative to the erasure power levels for zone 0 and zone 16. For zone 16, the value to which the test erasure power level Pe is initialized at step S33 is calculated based on the test erasure power level Pe determined for zone 0.

According to the present invention, it is apparent that a wide range of different embodiments can be constructed based on the invention without a departure from the spirit and scope of the invention. This invention will be limited by the appended claims but not restricted by any specific embodiments.

What is claimed is:

1. An optical disk drive, comprising:
   a laser control means for controlling the power level of laser light with which data is recorded in a test area on a recording medium;
   an information reproducing means for reading and reproducing recorded information, which has been recorded with said power level, from said recording medium;
   an amplitude measuring means for measuring the amplitude of a reproduced signal produced by said information reproducing means; and
   a recording power level calculating means for, after said laser control means sequentially varies said power level to write data in said test area on said recording medium, when said amplitude measuring means measures the amplitude of said reproduced signal representing the data written in said test area, calculating said recording power level according to a test power level with which the result of measuring the amplitude falls within a predetermined range, wherein said laser control means sequentially varies said power level by a first variation to write data in said test area, said amplitude measuring means measures the amplitude of said reproduced signal representing data written in said test area, and said power level with which the result of measuring the amplitude falls within a first predetermined range is adopted as a first test power level;
   said laser control means sequentially varies said first test power level by a second variation, which is smaller than said first variation, to write data in said test area, said amplitude measuring means measures the amplitude of said reproduced signal representing data written in said test area, and said power level with which the result of measuring the amplitude falls within a second range narrower than said first predetermined range is adopted as a second test power level; and
   said second test power level is adopted as a test power level.

2. An optical disk drive according to claim 1, wherein said laser control means multiplies said test power having said second test power level adopted as the test power level by a plurality of predetermined coefficients to thereby calculate writing power levels for recording according to multiple values.

3. An optical disk drive according to claim 1, wherein said laser control means multiplies said test power having said second test power level adopted as the test power level by predetermined coefficients to thereby calculate erasure power levels for erasing data.

4. An optical disk drive, comprising:
   a laser control means for arbitrarily controlling the power of laser light with which data is recorded in a test area of a land or a groove on a recording medium;
   an information reproducing means for reading and reproducing record information, which has been with said power, from said recording medium;
   an amplitude measuring means for measuring the amplitude of a reproduced signal produced by said information reproducing means; and
   a power calculating means for, after said laser control means sequentially varies said power to write data in said test area on said recording medium, when said amplitude measuring means measures the amplitude of said reproduced signal representing data written in said test area, calculating a record power at the land or groove by multiplying a test power that is said power with which the result of measuring the amplitude falls within a predetermined range by a predetermined coefficient,
   wherein said laser control means sequentially varies said power by a first variation to write data in said test area, said amplitude measuring means measures the amplitude of said reproduced signal representing data written in said test area, and said power with which the result of measuring the amplitude falls within a predetermined range is adopted as a first test power;
   said laser control means sequentially varies said first test power by a second variation, which is smaller than said first variation, to write data in said test area, said amplitude measuring means measures the amplitude of said reproduced signal representing data written in said test area, and said power with which the result of measuring the amplitude falls within a second range narrower than said first predetermined range is adopted as a second test power; and
   said second test power is adopted as said test power.

5. An optical disk drive according to claim 4, wherein said laser control means multiplies said test power having said second test power level adopted as the test power level by a plurality of predetermined coefficients to thereby calculate writing power levels for recording according to multiple values.

6. An optical disk drive according to claim 4, wherein said laser control means multiplies said test power having said second test power level adopted as the test power level by predetermined coefficients to thereby calculate erasure power levels for erasing data.

* * * * *